US012474669B2

(12) United States Patent
Shao et al.

(10) Patent No.: US 12,474,669 B2
(45) Date of Patent: Nov. 18, 2025

(54) PROCESS CARTRIDGE HAVING INFORMATION IDENTIFICATION PART AND IMAGE-FORMING APPARATUS

(71) Applicant: Zhuhai Pantum Electronics Co., Ltd., Zhuhai (CN)

(72) Inventors: Zhe Shao, Zhuhai (CN); Dewen Huo, Zhuhai (CN); Hongjian Yang, Zhuhai (CN); Peihuan Tang, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/470,848

(22) Filed: Sep. 20, 2023

(65) Prior Publication Data

US 2024/0111247 A1 Apr. 4, 2024

(30) Foreign Application Priority Data

Sep. 30, 2022 (CN) ......................... 202211216161.5

(51) Int. Cl.
*G03G 21/00* (2006.01)
*G03G 21/18* (2006.01)

(52) U.S. Cl.
CPC ..... *G03G 21/1875* (2013.01); *G03G 21/1867* (2013.01); *G03G 21/1871* (2013.01);
(Continued)

(58) Field of Classification Search
CPC ........... G03G 21/1875; G03G 21/1867; G03G 21/1871; G03G 21/1807; G03G 21/1652;
(Continued)

(56) References Cited

U.S. PATENT DOCUMENTS 5,452,059 A 9/1995 Sekiya
10,248,041 B2 * 4/2019 Suzuki ............... G03G 21/1825
(Continued)

FOREIGN PATENT DOCUMENTS

CN 101071282 A 11/2007
CN 106990692 A 7/2017
(Continued)

OTHER PUBLICATIONS

The European Patent Office (EPO) The Extended European Search Report for 23196120.2 Feb. 13, 2024 11 Pages.

*Primary Examiner* — Robert B Beatty
(74) *Attorney, Agent, or Firm* — Anova Law Group, PLLC

(57) ABSTRACT

The present disclosure provides a process cartridge, a process cartridge group and an image-forming apparatus. The process cartridge includes a driving portion, configured to receive a driving force from a driving apparatus in the image-forming apparatus; an image-forming structural part, configured to be connected to the driving portion; and an information identification part, including a plurality of electrical contacts electrically connected to the image-forming apparatus. When the process cartridge is installed in the image-forming apparatus, a minimum distance between any electrical contact of the information identification part and a side plate of the image-forming apparatus adjacent to the driving portion is H, and a value of the distance H is determined corresponding to attribute information of the process cartridge and/or an installation position of the process cartridge in the image-forming apparatus.

18 Claims, 12 Drawing Sheets

(52) U.S. Cl.
CPC ..... *G03G 21/1878* (2013.01); *G03G 21/1885* (2013.01); *G03G 2221/1823* (2013.01); *G03G 2221/1869* (2013.01)

(58) Field of Classification Search
CPC ........... G03G 21/1878; G03G 21/1885; G03G 21/1842; G03G 21/185; G03G 2221/1869; G03G 2221/166; G03G 2221/1823
USPC .............................................. 399/12, 25, 112
See application file for complete search history.

(56) References Cited

U.S. PATENT DOCUMENTS

| | | | | |
|---|---|---|---|---|
| 2009/0035014 | A1 | 2/2009 | Sato | |
| 2009/0214249 | A1* | 8/2009 | Lee | G03G 15/0863 399/113 |
| 2009/0269097 | A1* | 10/2009 | Hashimoto | G03G 21/1652 399/90 |
| 2012/0039622 | A1 | 2/2012 | Cho | |
| 2015/0055975 | A1* | 2/2015 | Sato | G03G 21/1661 399/110 |
| 2016/0238967 | A1* | 8/2016 | Fukui | G03G 21/1885 |
| 2017/0185034 | A1 | 6/2017 | Moon et al. | |
| 2018/0181055 | A1 | 6/2018 | Itabashi | |
| 2018/0181058 | A1* | 6/2018 | Yokoi | G03G 21/1867 |
| 2019/0391529 | A1* | 12/2019 | Abe | G03G 21/1878 |
| 2020/0133188 | A1 | 4/2020 | Amann et al. | |
| 2020/0285192 | A1* | 9/2020 | Kawamura | G03G 21/1871 |
| 2021/0096498 | A1 | 4/2021 | Sugiura et al. | |
| 2021/0191310 | A1* | 6/2021 | Maeta | G03G 21/1817 |
| 2021/0311411 | A1* | 10/2021 | Kusuda | G03G 21/1652 |
| 2022/0019173 | A1* | 1/2022 | Kyotani | G03G 15/55 |
| 2024/0353794 | A1* | 10/2024 | Shao | G03G 21/1842 |

FOREIGN PATENT DOCUMENTS

| | | | |
|---|---|---|---|
| CN | 109725520 | A | 5/2019 |
| CN | 115494712 | A | 12/2022 |
| CN | 116931405 | A | 10/2023 |
| JP | 2012022333 | A | 2/2012 |
| WO | 2015165322 | A1 | 11/2015 |

* cited by examiner

PROCESS CARTRIDGE HAVING INFORMATION IDENTIFICATION PART AND IMAGE-FORMING APPARATUS

CROSS-REFERENCE TO RELATED APPLICATION

This application claims the priority to Chinese patent application No. 202211216161.5, filed on Sep. 30, 2022, and No. 202310834498.0, filed on Jul. 12, 2023, the entirety of all of which is incorporated herein by reference.

TECHNICAL FIELD

The present disclosure generally relates to the field of printer technology and, more particularly, relates to a process cartridge, a process cartridge group and an image-forming apparatus.

BACKGROUND

Image-forming apparatuses such as laser printers, copiers, compound machines and other products are provided with process cartridges inside; and each process cartridge is provided with a corresponding chip for recording information of each process cartridge. After the process cartridge is installed inside the image-forming apparatus, the process cartridge chip may be connected to a main body of the image-forming apparatus through a contact detection part in the image-forming apparatus to identify and collect information of the process cartridge.

For the image-forming apparatus in the existing technology, a movable part connected to the contact detection part is disposed inside the image-forming apparatus, and a driving action of the movable part is configured to connect the contact detection part to the process cartridge chip after the process cartridge is installed completely. However, such manner has a complex structure which may be easily damaged. In addition, in the existing technology, when the image-forming apparatus is installed with multiple process cartridges, electrical contacts of multiple process cartridge chips are arranged on a same plane at one side of the process cartridges or on a same plane at the tops of the process cartridges. The electrical contacts of all process cartridge chips are in different contact forces with corresponding contact detection parts inside the image-forming apparatus. Therefore, the electrical contacts of all process cartridge chips arranged on a same plane may result in poor connection stability between the contact detection parts and the electrical contacts of the process cartridge chips, thereby affecting user's operation.

SUMMARY

The present disclosure provides a process cartridge, a process cartridge group, and an image-forming apparatus to solve at least one problem in above-mentioned existing technology.

The first aspect of the present disclosure provides a process cartridge group, including:

- a first process cartridge, including a first image-forming structural part and a first information identification part, where the first image-forming structural part includes a first end surface; when the first process cartridge is installed in a main body of an image-forming apparatus, the first end surface is adjacent to a driving apparatus in the image-forming apparatus; the first information identification part includes a plurality of first electrical contacts; the plurality of first electrical contacts is configured to be in contact with and electrically connected to first contact detection parts disposed in the main body of the image-forming apparatus; and taking any point on the first end surface as a first reference point, a plane passing through the first reference point and perpendicular to a length direction of the first process cartridge is a first reference plane; and
- a second process cartridge, including a second image-forming structural part and a second information identification part, where the second image-forming structural part includes a second end surface; when the second process cartridge is installed in the main body of the image-forming apparatus, the second end surface is adjacent to the driving apparatus in the image-forming apparatus; the second information identification part includes a plurality of second electrical contacts; the plurality of second electrical contacts is configured to be in contact with and electrically connected to second contact detection parts disposed in the main body of the image-forming apparatus; and taking any point on the second end surface as a second reference point, a plane passing through the second reference point and perpendicular to the length direction of the second process cartridge is a second reference plane, where:

when the first process cartridge and the second process cartridge are installed in the main body of the image-forming apparatus, a minimum distance between any first electrical contact and the first reference plane is L1; a minimum distance between any second electrical contact and the second reference plane or the first reference plane is L2, and L1 is different from L2.

In above solution, during the process of installing the process cartridge, since L1 is different from L2, the process of installing and uninstalling the process cartridge into the main body of the image-forming apparatus may be smoother; and the contact force between the electrical contacts of each information identification part and corresponding contact detection part in the main body of the image-forming apparatus may be more balanced, and the electrical contact of the information identification part of each process cartridge may only be in contact with and communicate with the contact detection part on corresponding main body of the image-forming apparatus, which may reduce wear of the electrical contacts of the information identification part.

The second aspect of the present disclosure provides an image-forming apparatus, including a main body, where the main body is disposed with an installation chamber; a plurality of contact detection parts is disposed on a sidewall of the installation chamber; each contact detection part includes a plurality of electrical contact portions for being in contact with electrical contacts disposed on a process cartridge; the plurality of contact detection parts includes a first contact detection part and a second contact detection part; and a minimum distance between an electrical contact portion of the first contact detection part and the sidewall is D1, and a minimum distance between an electrical contact portion of the second contact detection part and the sidewall is D2, where D1 is different from D2.

Above structure may make, when the main body of the image-forming apparatus is installed into the process cartridge or the process cartridge group, the friction distance between the electrical contact of the information identification part of the process cartridge and the contact detection part in the main body is short (the electrical contact of each information identification part may only rub against its corresponding contact detection part), and the wear on the electrical contact and the contact detection part may be relatively small.

The third aspect of the present disclosure provides a process cartridge, detachably installed on an image-forming apparatus, including:

- a driving portion, configured to receive a driving force from a driving apparatus in the image-forming apparatus;
- an image-forming structural part, configured to be connected to the driving portion; and
- an information identification part, including a plurality of electrical contacts electrically connected to the image-forming apparatus, where:
- when the process cartridge is installed in the image-forming apparatus, a minimum distance between any electrical contact of the information identification part and a side plate of the image-forming apparatus adjacent to the driving portion is H, and a value of the distance H is determined corresponding to attribute information of the process cartridge and/or an installation position of the process cartridge in the image-forming apparatus.

Other features and advantages of embodiments of the present disclosure are described in the following description, and partly become apparent from the description, or may be understood by implementing embodiments of the present disclosure. The objectives and other advantages of embodiments of the present disclosure are realized and obtained by structures particularly pointed out in the specification and drawings.

BRIEF DESCRIPTION OF THE DRAWINGS

To clearly describe technical solutions of various embodiments of the present disclosure, the drawings which need to be used for describing various embodiments are described below. Obviously, the drawings in the following description are merely some embodiments of the present disclosure. For those skilled in the art, other drawings may be obtained in accordance with the drawings without creative efforts.

DETAILED DESCRIPTION

To better understand technical solutions of the present disclosure, embodiments of the present disclosure are described in detail with reference to accompanying drawings.

Specific embodiments are described below based on the structure of the image-forming apparatus provided in embodiments of the present disclosure.

As shown in FIGS. 1-5, the first aspect of the present disclosure provides a process cartridge, which may be detachably installed in a main body 2000 of an image-forming apparatus 100. In embodiments of the present disclosure, the process cartridge may take a first process cartridge 1011 as an example.

Figure 5:
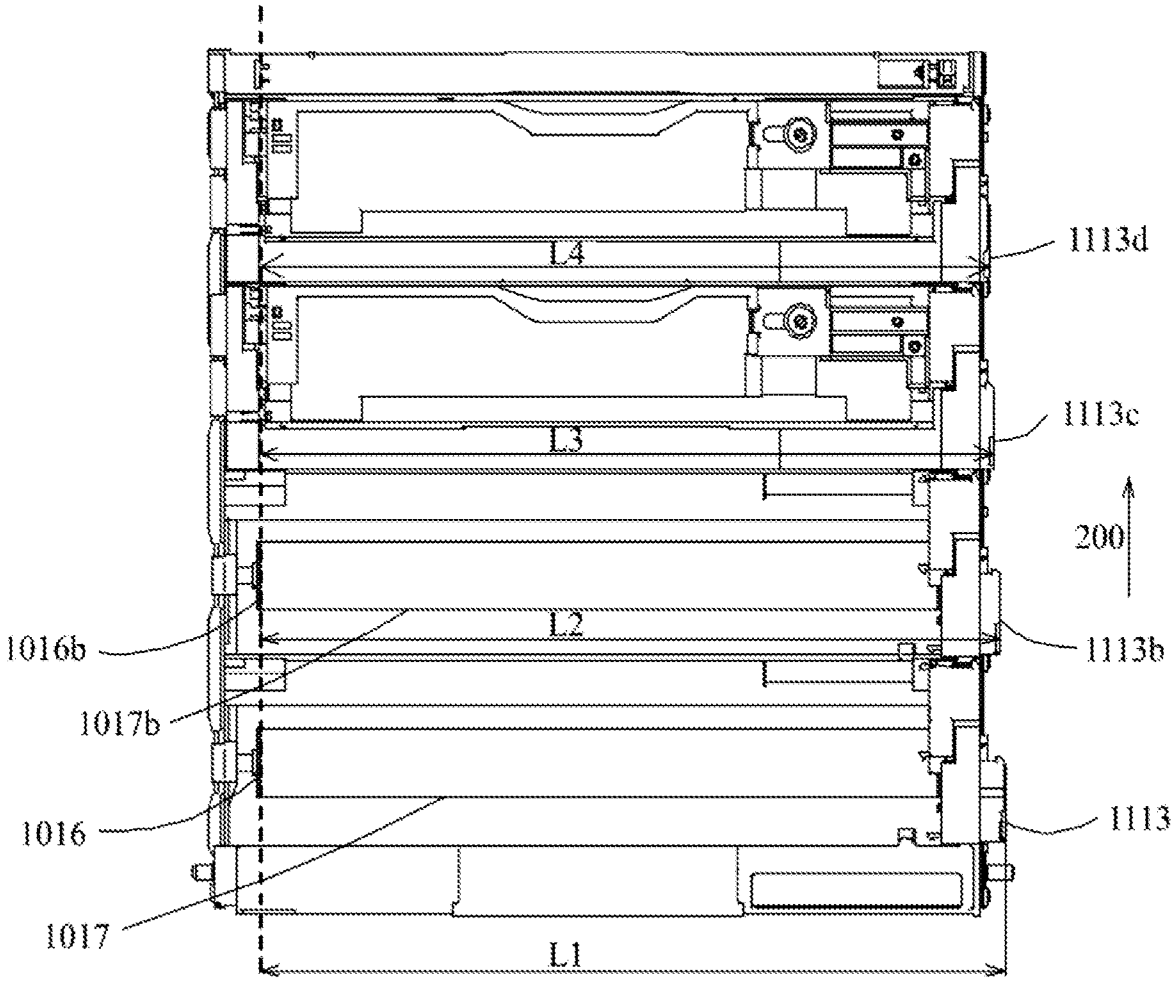
FIG. 5 illustrates a partial cross-sectional top view of a process cartridge group provided by exemplary embodiments of the present disclosure.

The process cartridge in the present disclosure may include a first image-forming structural part (the first image-forming structural part is disposed inside the process cartridge in the present disclosure) and a first information identification part 1111; and the first image-forming structural part may include a first end surface 1016. The first image-forming structural part may include a first photosensitive drum or a first developing roller; the first end surface 1016 may be an axial end surface of the first photosensitive drum or an axial end surface of the first developing roller; and taking any point on the first end surface 1016 as a first reference point, a plane passing through the first reference point and perpendicular to the length direction of the process cartridge of the present disclosure (the direction shown by an arrow 10 in FIG. 2) may be a first reference plane. In one embodiment, as shown in FIG. 5, the first end surface 1016 may be the axial end surface of the first photosensitive drum 1017, and the plane where the first end surface 1016 is located may be perpendicular to the length direction of the first process cartridge 1011, such that the plane where the first end surface 1016 is located may be used as an example of the first reference plane. Obviously, in other embodiments, if the plane where the first end surface 1016 is located is not perpendicular to the length direction of the first process cartridge 1011 or the first end surface 1016 is non-planar, any point on the first end surface 1016 may be selected as the first reference point, and the plane passing through the first reference point and perpendicular to the length direction of the first process cartridge 1011 may be used as the first reference plane. The first photosensitive drum or the first developing roller may be conventional components of the process cartridge of the present disclosure. It should be added that above-mentioned first image-forming structural part may also be another component such as a toner feeding roller and the like disposed on the process cartridge of the present disclosure, which may not be limited herein. When the process cartridge of the present disclosure is installed in the main body 2000, the first end surface 1016 may be a surface adjacent to the driving apparatus in the image-forming apparatus 100, where the driving apparatus may be an apparatus installed inside the image-forming apparatus 100 for driving the movement of the image-forming structural part inside the process cartridge of the present disclosure, which may not be shown in drawings. The process cartridge of the present disclosure may further include a driving portion 1018 for receiving a driving force from the driving apparatus in the image-forming apparatus to move the image-forming structural part inside the process cartridge of the present disclosure.

The first information identification part 1111 may protrude along the length direction of the process cartridge of the present disclosure (the direction shown by the arrow 10 in FIG. 2); the first information identification part 1111 may include a plurality of first electrical contacts 1113; and the plurality of first electrical contacts 1113 may be configured for being in contact with and electrically connecting to the first contact detection parts disposed in the main body 2000. It should be noted that the first electrical contact 1113 may be an electrical contact disposed in the main body of the first information identification part 1111 or an electrical contact not disposed in the main body of the first information identification part 1111. For example, when the first electrical contact 1113 is an electrical contact not disposed in the main body of the first identification part 1111*b*, the main body of the first information identification part 1111 may be disposed with a conductive contact, and the first electrical contact 1113 may be electrically connected to the conductive contact of the main body of the first information identification part 1111 through a conductive part.

In one embodiment, as shown in FIG. 5, when the process cartridge of the present disclosure is installed in the main body 2000, the minimum distance between any first electrical contact 1113 and the plane (the first reference plane) where the first end surface 1016 is located may be L1. In one embodiment, a plurality of first electrical contacts 1113 may protrude along the length direction of the process cartridge of the present disclosure. The plurality of first electrical contacts 1113 may protrude through an installation bracket 1015 which protrudes from an end surface of the process cartridge of the present disclosure (such end surface may be the end surface away from the driving portion of the process cartridge of the present disclosure) along the length direction of the process cartridge of the present disclosure and is on the process cartridge of the present disclosure. That is, the installation bracket 1015 may be an embodiment of the installation portion of the first electrical contact 1113 of the first information identification part. That is, the installation bracket 1015 may protrude a certain distance along the length direction of the process cartridge of the present disclosure. The maximum length (e.g., distance) that the installation bracket 1015 protrudes from the end surface of the first process cartridge 1011 away from the driving portion and along the length direction of the first process cartridge 1011 may be determined according to a color of the process cartridge of the present disclosure or an installation position of the process cartridge of the present disclosure in the image-forming apparatus.

Specifically, the plurality of first electrical contacts 1113 may be disposed on the side of the installation bracket 1015 in parallel with the first end surface 1016; such side may be the installation surface of the first electrical contacts 1113; and the minimum distance between the installation surface and the left side plate 2031 of the image-forming apparatus adjacent to the driving portion 1018 may be determined according to the color of the process cartridge of the present disclosure or the installation position of the process cartridge of the present disclosure in the image-forming apparatus.

Specifically, when the process cartridge of the present disclosure is installed in the main body 2000, the minimum distance between any first electrical contact 1113 and the plane (the first reference plane) where the first end surface 1016 is located may be L1. The minimum distance between the first electrical contact 1113 of the first information identification part 1111 and the plane (the first reference plane) where the first end surface 1016 is located may be modified by changing the specification and protrusion height of the installation bracket 1015. The protrusion height of the installation bracket 1015 may also be conveniently ground and adjusted to a certain extent, thereby adjusting the position error caused by the production process and improving installation accuracy.

In one embodiment, the first information identification part 1111 may further include a substrate 1112; and the plurality of first electrical contacts 1113 may be disposed on the substrate 1112. For example, the plurality of first electrical contacts 1113 may be arranged on the substrate 1112 along the height direction h of the process cartridge of the present disclosure. The arrangement manner of the first electrical contacts 1113 (which may be low-voltage contacts) along the height direction h of the process cartridge of the present disclosure may reduce the friction of the contact detection parts 2022 on the first electrical contacts, which may prevent the first electrical contacts 1113 from being damaged by wear and tear and improve reliability of the first information identification part 1111. In one embodiment, the specific protrusion manner of the plurality of first electrical contacts 1113 of the first information identification part 1111 may also be protruding along the length direction of the process cartridge of the present disclosure through the thickness of the substrate 1112 itself. For example, the substrate 1112 may be configured as a substrate with a certain thickness. After the substrate 1112 is installed in the process cartridge of the present disclosure, the minimum distance between any first electrical contact 1113 disposed on the substrate 1112 and the plane (the first reference plane) where the first end surface 1016 is located may be L1. The height of the substrate 1112 protruding from the process cartridge of the present disclosure may be changed by adjusting the assembly and connection manner. For example, the substrate 1112 may be directly disposed on the side surface in parallel with the first end surface 1016 on the installation bracket 1015 having above-mentioned structural arrangement. After the substrate 1112 is installed on the installation bracket 1015, the minimum distance between any first electrical contact 1113 on the substrate 1112 and the plane (the first reference plane) where the first end surface 1016 is located may be L1. The substrate in the present disclosure may be an IC substrate.

In other embodiments, the substrate 1112 may be disposed at any position of the process cartridge of the present disclosure; and the plurality of first electrical contacts 1113 may not be disposed on the substrate 1112, where the plurality of first electrical contacts 1113 may be electrically connected to the substrate 1112 through conductive components, and the conductive components may be conductive wires, as long as the plurality of first electrical contacts 1113 may protrude along the length direction of the process cartridge of the present disclosure, and the minimum distance between any first electrical contact 1113 and the plane (the first reference plane) where the first end surface 1016 is located may be L1.

Figure 1:
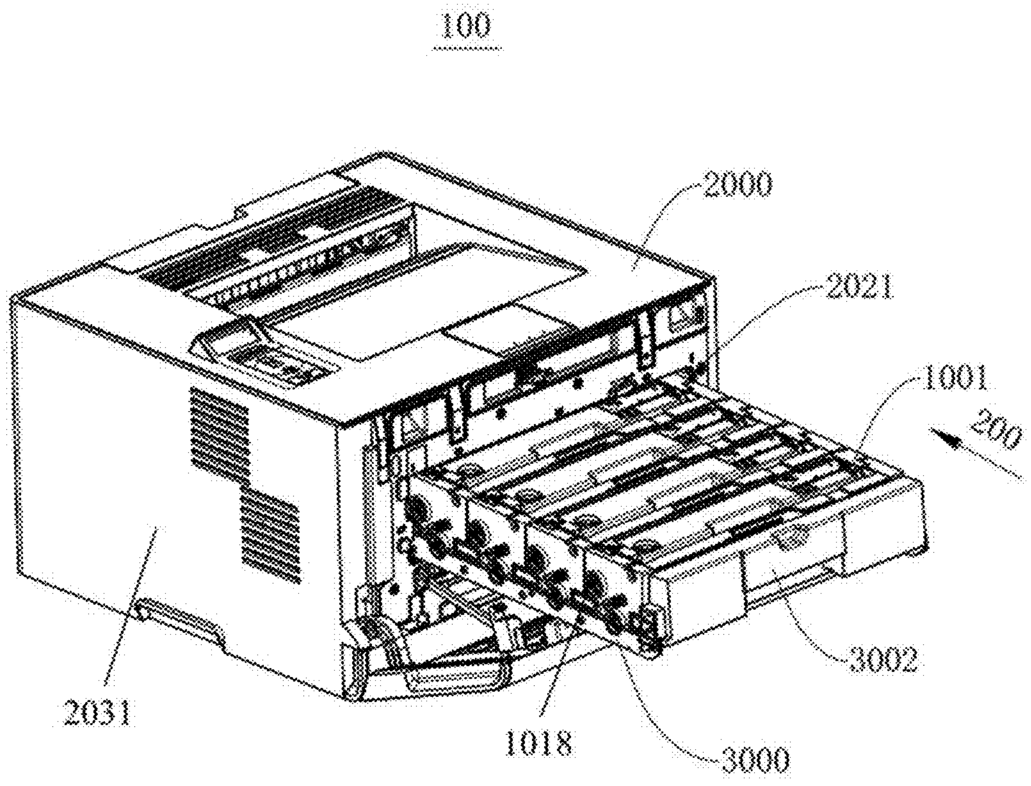
FIG. 1 illustrates a structural schematic of an image-forming apparatus provided by exemplary embodiments of the present disclosure.
Figure 14:
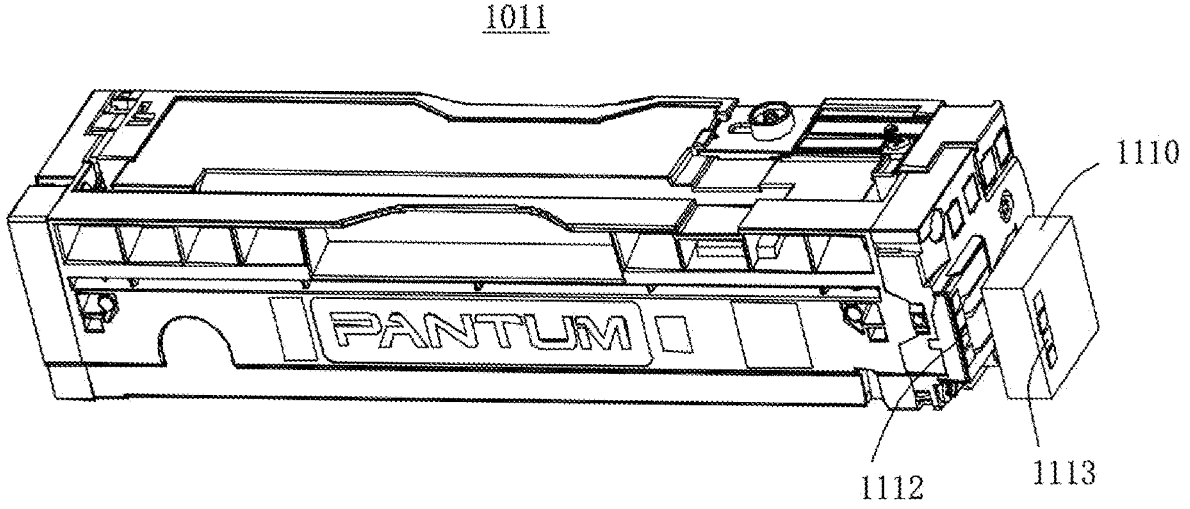
FIG. 14 illustrates a partial exploded view of a process cartridge provided by exemplary embodiments of the present disclosure.

In one embodiment, as shown in FIG. 14, the first information identification part 1111 of the process cartridge 1011 of the present disclosure may further include the substrate 1112 and a connecting part 1110; the connecting part 1110 may be sleeved on the substrate 1112 and electrically connected to the substrate 1112; and the plurality of first electrical contacts 1113 may be sequentially disposed on the connecting part 1110 along the height direction h of the first process cartridge and electrically connected to the substrate 1112 through the connecting part 1110. In one embodiment, the substrate 1112 may be disposed on an end surface of the process cartridge 1011 of the present disclosure, and the height of the substrate 1112 protruding from the end surface along the length direction of the process cartridge 1011 of the present disclosure may not be limited, as long as when the connecting part 1110 is sleeved on the substrate 1112, the plurality of first electrical contacts 1113 on the connecting part 1110 may be configured to protrude along the length direction of the process cartridge of the present disclosure, and the minimum distance between any first electrical contact 1113 and the plane (the first reference planes) where the first end surface 1016 is located may be L1. Obviously, in other embodiments, the substrate may also be disposed at any position of the process cartridge 1011 of the present disclosure. Different from above-mentioned embodiments, the connecting part 1110 may not be sleeved on the substrate 1112 but directly disposed on one end surface of the process cartridge of the present disclosure and protrude a certain height along the length direction of the process cartridge 1011 of the present disclosure and may be electrically connected with the substrate 1112 through a wire. The plurality of first electrical contacts 1113 may be disposed on the connecting part 1110 and electrically connected to the substrate 1112 through the connecting part 1110. As shown in FIG. 1, the main body 2000 may include a left side plate 2031 and a right side plate 2021 which are oppositely disposed, where the left side plate 2031 is a side plate adjacent to the driving portion 1018 of the process cartridge of the present disclosure.

In one embodiment, when the process cartridge of the present disclosure is installed in the main body 2000, the minimum distance between any electrical contact of the process cartridge of the present disclosure and the left side plate 2031 of the image-forming apparatus is H. The value of the distance H may be determined corresponding to the attribute information of the process cartridge of the present disclosure and/or the installation position of the process cartridge of the present disclosure in the image-forming apparatus 100. The attribute information of the process cartridge in the present disclosure may include at least one type of the color of the process cartridge, the capacity of the developer, and the model. In addition, one of various attribute information types of the process cartridge or one of various installation positions of the process cartridge may be selected, and each attribute information type and/or each installation position may correspond to different preset distances respectively. The only difference between one embodiment and above-mentioned embodiments is that the minimum distances between the electrical contacts of the process cartridge and different reference planes may be different. That is, in above-mentioned embodiments, the plane where the first end surface 1016 is located may be configured as the reference plane; and in one embodiment, the left side plate 2031 of the image-forming apparatus may be configured as the reference plane. As mentioned above, the plurality of electrical contacts in one embodiment may be installed in various forms, which may not be described in detail herein.

Figure 12:
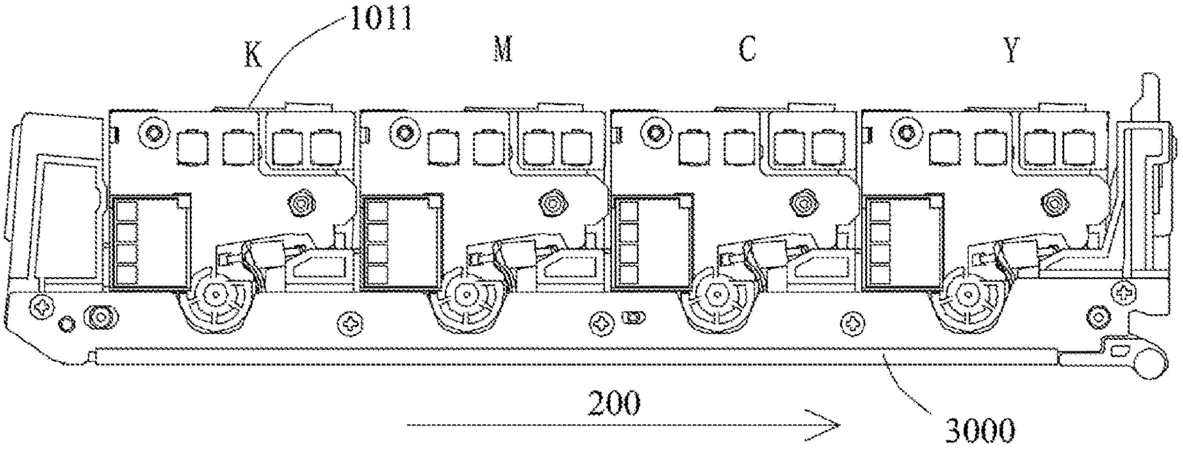
FIG. 12 illustrates a schematic of connection between a plurality of process cartridges and a moving part provided by exemplary embodiments of the present disclosure.

For example, as shown in FIGS. 1 and 12, along the installation direction 200 of the process cartridge in the image-forming apparatus, black (K), magenta (M), cyan (C), yellow (Y) process cartridges may be installed sequentially in the image-forming apparatus. When the black (K), magenta (M), cyan (C), and yellow (Y) process cartridges are all installed in the image-forming apparatus, the minimum distance between any electrical contact of the information identification part of the black (K) process cartridge and the left side plate 2031 of the image-forming apparatus adjacent to the driving portion 1018 is H1, the minimum distance between any electrical contact of the information identification part of the magenta (M) process cartridge and the left side plate 2031 of the image-forming apparatus adjacent to the driving portion 1018 is H2, the minimum distance between any electrical contact of the information identification part of the cyan (C) process cartridge and the left side plate 2031 of the image-forming apparatus adjacent to the driving portion 1018 is H3, and the minimum distance between any electrical contact of the information identification part of the yellow (Y) process cartridge and the left side plate 2031 of the image-forming apparatus adjacent to the driving portion 1018 is H4; where, H1>H2>H3>H4. In addition, the value of the distance H corresponding to current color may be determined from above-mentioned H1, H2, H3, and H4 according to the color of the process cartridge. For example, if the process cartridge of the present disclosure takes the first process cartridge 1011 as an example, the first process cartridge 1011 may be the black process cartridge, and the value of H may be determined to be H1; and if the process cartridge of the present disclosure is the magenta process cartridge, the value of H may be determined to be H2; and so on.

For example, other process cartridges may also be detachably installed in the main body 2000. In one embodiment, other process cartridges may be process cartridges in the image-forming apparatus 100 other than the process cartridge of the present disclosure. One or more other process cartridges may be included, which may mainly depend on the number of installed process cartridges needed for the function of the image-forming apparatus 100. The second process cartridge 1011*b* may be taken as an example for other process cartridges in one embodiment.

For example, the other process cartridge may include a second image-forming structural part (the second image-forming structural part may be disposed inside the other process cartridge and may be a conventional functional part in the process cartridge) and a second information identification part 1111*b*. The second image-forming structural part may include a second end surface 1016*b*. The second image-forming structural part may be a second photosensitive drum or a second developing roller; and the second end surface 1016*b* may be an axial end surface of the second photosensitive drum or an axial end surface of the second developing roller. Taking any point on the second end surface 1016*b* as a second reference point, the plane passing through the second reference point and perpendicular to the length direction of the process cartridge may be the second reference plane. In one embodiment, as shown in FIG. 5, the second end surface 1016*b* may be the axial end surface of the second photosensitive drum 1017*b*, and the plane where the second end surface 1016*b* is located may be perpendicular to the length direction of the second process cartridge 1011*b*, such that the plane where the second end surface 1016*b* is located may be used as an example of the second reference plane. Obviously, in other embodiments, if the second end surface 1016*b* is not perpendicular to the length direction of the second process cartridge 1011*b* or the second end surface 1016*b* is non-planar, any point on the second end surface 1016*b* may be selected as the second reference point, and the plane passing through the second reference point and perpendicular to the length direction of the second process cartridge 1011*b* may be taken as the second reference plane. It should be added that above-mentioned second image-forming structural part may also be another component such as a toner feeding roller and the like disposed on other process cartridge, which may not be limited herein.

When other process cartridge is installed in the main body 2000, the second end surface 1016*b* may be adjacent to the driving apparatus in the image-forming apparatus 100, which is not shown in drawings. The second information identification part 1111*b* may protrude along the length direction of the other process cartridges. The second information identification part 1111*b* may include a plurality of second electrical contacts 1113*b* which may be configured to be electrically connected to the second contact detection part disposed in the main body 2000. The minimum distance between any second electrical contact 1113*b* and the plane where the second end surface 1016*b* is located (the second reference plane) or the minimum distance between any second electrical contact 1113*b* and the plane (the first reference plane) where the first end surface 1016 is located may be L2 (referring to FIG. 5). When the process cartridge of the present disclosure and other process cartridge are installed in the main body 2000, L1 may be different from L2. In one embodiment, the plane where the first end surface 1016 is located and the plane where the second end surface 1016*b* is located may be in a same plane; that is, the first reference plane and the second reference plane may be in a same plane (shown in the dotted line in FIG. 5 as an example of the plane). Obviously, in other embodiments, the plane where the first end surface 1016 is located (the first reference plane) and the plane where the second end surface 1016*b* is located (the second reference plane) may also be located in different planes. When such two planes are different, the minimum distance L2 between any second electrical contact 1113*b* and the first reference plane may be different from L1. It should be noted that the protruding arrangement of the second electrical contacts 1113*b* of the second information identification part 1111*b* may be similar to the protruding arrangement of the first electrical contacts 1113 of the first information identification part 1111, which may not be described in detail herein. In addition, above-mentioned first image-forming structural part and the second image-forming structural part may be in one-to-one correspondence; and the first image-forming structural part and the second image-forming structural part may refer to a same type of components. For example, both the first image-forming structural part and the second image-forming structural part may be photosensitive drums, developing rollers, or toner feeding rollers or the like.

Through such configuration, when the process cartridge of the present disclosure and other process cartridge are installed in the main body 2000, L1 may be different from L2, such that the electrical contact force between the electrical contacts of the information identification part of the process cartridge of the present disclosure and the contact detection part 2022 in the main body 2000 may be more uniform, which may be beneficial for ensuring the electrical connection stability between the electrical contacts and the contact detection part 2022.

The first electrical contact 1113 may be fixedly disposed relative to the process cartridge of the present disclosure (the first process cartridge 1011), or the first electrical contact 1113 may be movably disposed relative to the process cartridge of the present disclosure (the first process cartridge 1011); and the second electrical contact 1113*b* may be fixedly disposed relative to other process cartridge (the second process cartridge 1011*b*), or the second electrical contact 1113*b* may be movably disposed relative to other process cartridge (the second process cartridge 1011*b*).

In one embodiment, the first electrical contact 1113 may be fixedly disposed on the process cartridge of the present disclosure, the second electrical contact 1113*b* may be fixedly disposed on other process cartridge, and L1 may be different from L2. That is, regardless of whether the process cartridge of the present disclosure and other process cartridge are installed in the main body 2000, the values of L1 and L2 may be fixed respectively.

In another embodiment, the first electrical contact 1113 may be movably disposed on the process cartridge of the present disclosure, and the second electrical contact 1113*b* may be movably disposed on other process cartridge. When the process cartridge of the present disclosure and other process cartridge are installed in the main body is 2000, L1 may be different from L2. It should be understood that since both the first electrical contact 1113 and the second contact are movably disposed, both L1 and L2 may be changed. When the process cartridge of the present disclosure and other process cartridge are not installed in the main body 2000, L1 and L2 may be same or different, as long as it ensures that when both the process cartridge of the present disclosure and other process cartridge are installed in the main body 2000, L1 is different from L2.

In another embodiment, the first electrical contact 1113 may be movably disposed on the process cartridge of the present disclosure, and the second electrical contact 1113*b* may be fixedly disposed on other process cartridge. When the process cartridge of the present disclosure and other process cartridge are installed in the main body 2000, L1 may be different from L2. That is, since the first electrical contact 1113 is movably disposed, L1 may be changed. When the process cartridge of the present disclosure and other process cartridge are not installed in the main body 2000, L1 and L2 may be same or different, as long as it ensures that when both the process cartridge of the present disclosure and other process cartridge are installed in the main body 2000, L1 may be different from L2.

In another embodiment, the first electrical contact 1113 may be fixedly disposed on the process cartridge of the present disclosure, and the second electrical contact 1113*b* may be movably disposed on other process cartridges. When the process cartridge of the present disclosure and other process cartridge are installed in the main body 2000, L1 may be different from L2. That is, since the second electrical contact 1113*b* is movably disposed, L2 may be changed. When the process cartridge of the present disclosure and other process cartridge are not installed in the main body 2000, L1 and L2 may be same or different, as long as it ensures that when both the process cartridge of the present disclosure and other process cartridge are installed in the main body 2000, L1 may be different from L2.

The manner of the electrical contact of above-mentioned information identification part movably disposed on the process cartridge may be that the electrical contact may have angular displacement changes along the height or width direction of the process cartridge and may also be that the electrical contacts may have linear displacement changes along the length direction of the process cartridge. The moving manner of the electrical contact may be that the electrical contact may be connected to the process cartridge through an elastic part, or the electrical contact itself may include an elastic structural part, which may not be limited in the present disclosure.

Figure 10:
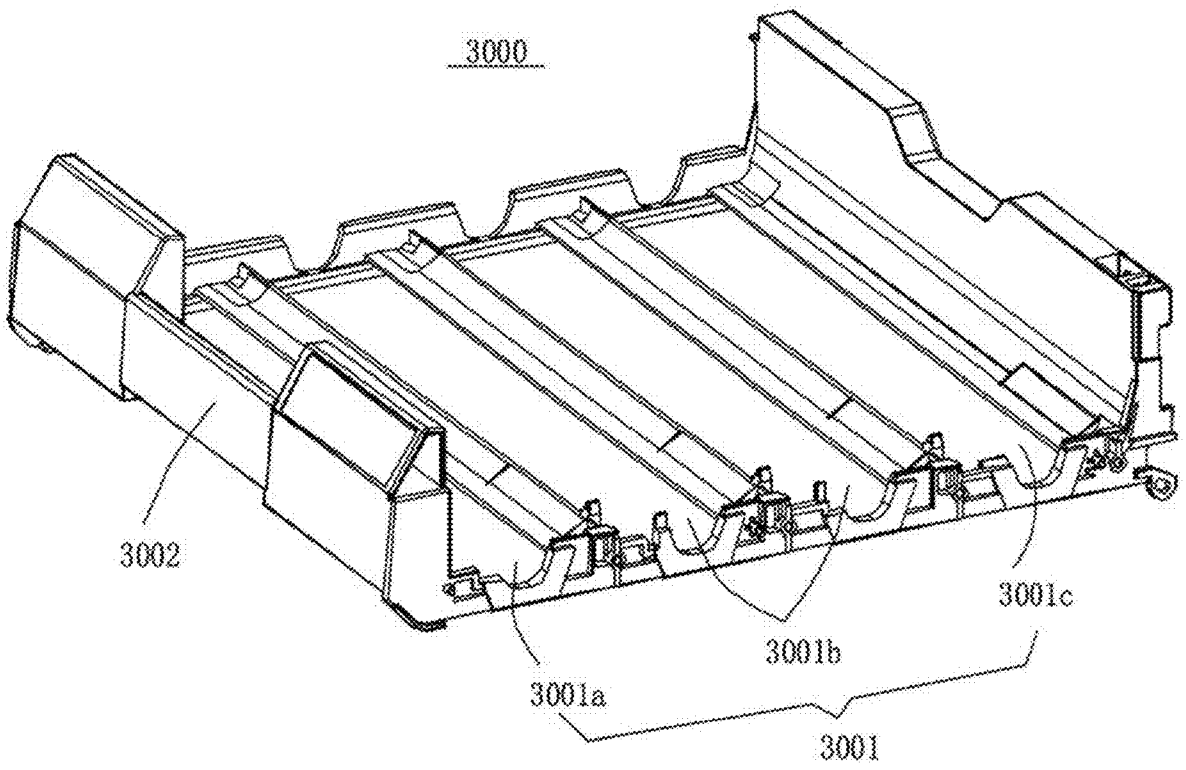
FIG. 10 illustrates a structural schematic of a moving part provided by exemplary embodiments of the present disclosure.

In one embodiment, as shown in FIG. 1 or FIG. 10, the image-forming apparatus 100 may further include a moving part 3000 which is movably installed in the main body 2000. The moving part 3000 may include an operation portion 3002 and a plurality of installation positions 3001 for installing the process cartridge of the present disclosure; and the moving part 3000 may be inserted into the inside of the main body 2000 along an installation direction 200 or drawn out from the inside of the main body 2000 along a direction opposite to the installation direction 200. That is, after the moving part 3000 is installed in the main body 2000, the moving part 3000 may move relative to the main body 2000 from the first position to the second position. The second position may be that the moving part 3000 is completely accommodated in the image-forming apparatus 100, and the first position may be that the moving part 3000 is completely outside the image-forming apparatus 100. The process cartridge of the present disclosure and other process cartridge may both be detachably installed on the moving part 3000; and when the moving part 3000 moves to the second position, the process cartridge of the present disclosure may be electrically connected with the main body 2000, that is, the electrical contact of the process cartridge of the present disclosure may be electrically connected to the electrical contact detection part 2022 in the main body 2000.

As shown in FIG. 10, the plurality of installation positions 3001 may include a first installation position 3001*a*, a second installation position 3001*c*, and a third installation position 3001*b* between the first installation position 3001*a* and the second installation position 3001*c*. Compared with other installation positions 3001 among the plurality of installation positions 3001, the first installation position 3001*a* may be closer to the operation portion 3002, and the second installation position 3001*c* may be farther away from the operation portion 3002. For example, when the plurality of installation positions 3001 includes four installation positions 3001, the position closer to the operation portion 3002 may be the first installation position 3001*a*, the position farther away from the operation portion 3002 may be the second installation position 3001*c*; and two installation positions 3001 between the first installation position 3001*a* and the second installation position 3001*c* may both be the third installation positions 3001*b*.

Figure 15:
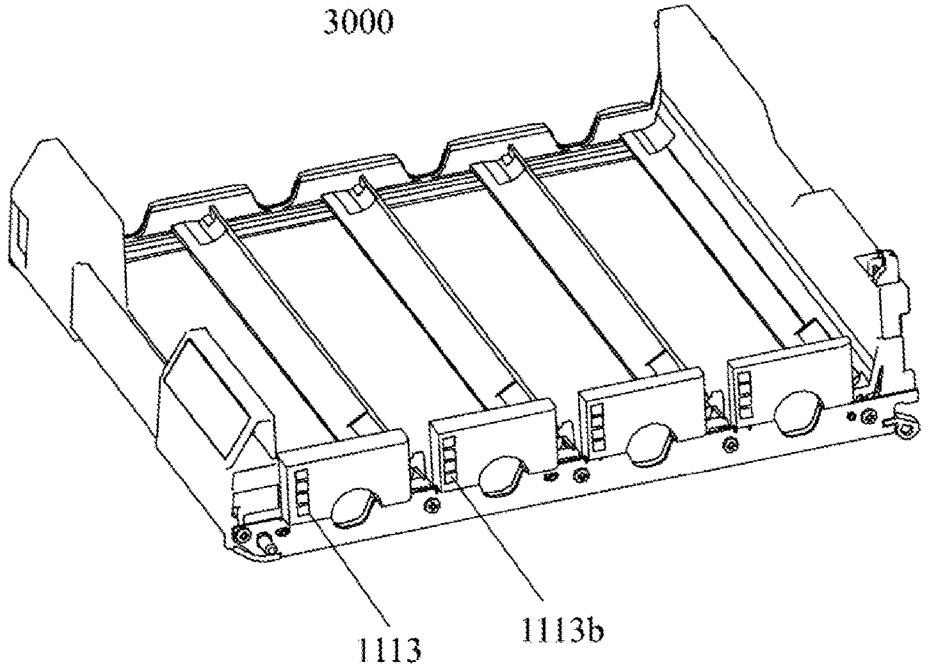
FIG. 15 illustrates a structural schematic of another moving part provided by exemplary embodiments of the present disclosure.
Figure 16:
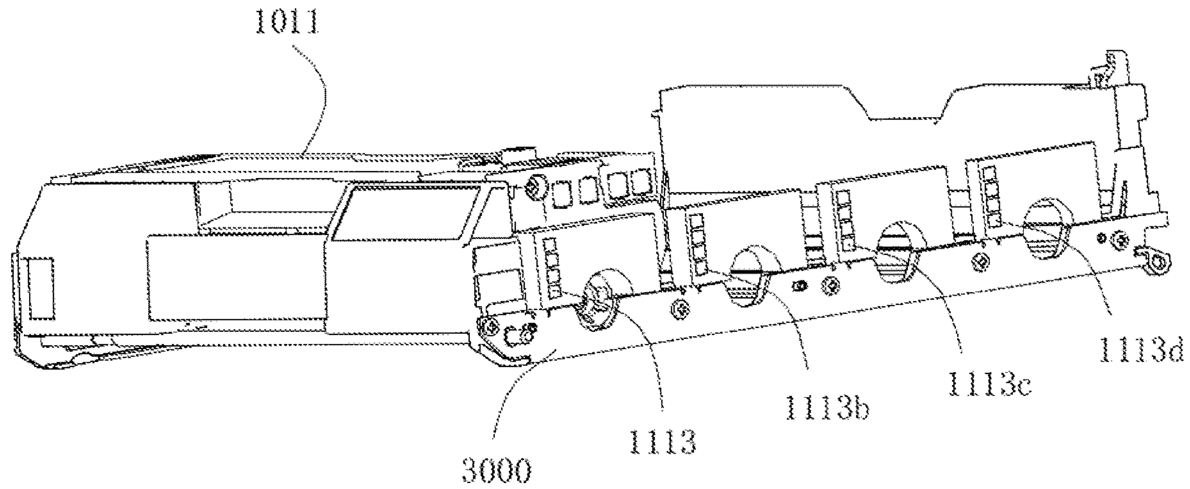
FIG. 16 illustrates a schematic structural of a process cartridge installed in a moving part in FIG. 15 provided by exemplary embodiments of the present disclosure.

In another embodiment, above-mentioned moving part 3000 may be included in the process cartridge of the present disclosure, and the structure of the moving part 3000 may be same as the structure in above-mentioned embodiments, which may not be described in detail herein. Different from above-mentioned embodiments, the electrical contacts of above-mentioned information identification part may be disposed in the main body of corresponding process cartridge or on the moving part 3000, as long as it ensures that the electrical contacts of the information identification part may be in contact with and electrically connected to the electrical contact detection part 2022 in the main body 2000 when the moving part installed with the process cartridge moves from the first position to the second position. As shown in FIGS. 15-16, the process cartridge of the present disclosure may include the moving part 3000 which is movably installed in the main body of the image-forming apparatus, where the process cartridge of the present disclosure (the first process cartridge 1011) may be installed on the moving part 3000. The plurality of first electrical contacts 1113 of the first information identification part 1111 of the process cartridge (the first process cartridge 1011) of the present disclosure may be disposed on the outside of the moving part 3000. When the first process cartridge 1011 is installed in the moving part 3000, the plurality of first electrical contacts 1113 may be electrically connected to the main body of the first information identification part 1111 installed on the first process cartridge 1011. The minimum distance between any first electrical contact 1113 and the plane (the first reference plane) where the first end surface 1016 is located may be L1.

The moving part 3000 may be also configured to install other process cartridges (such as the second process cartridge 1011*b*), that is, the moving part 3000 may be disposed with installation positions corresponding to the number of process cartridges. In one embodiment, the electrical contacts of the information identification part of each process cartridge may be disposed outside the moving part 3000. In other embodiments, according to actual need, the electrical contacts of the information identification parts of certain process cartridges may be disposed outside the moving part 3000, and the electrical contacts of the information identification parts of certain process cartridges may be disposed in the main body of the process cartridge. Through above configuration, the electrical contacts of the information identification part of the process cartridge may be in contact with and electrically connected to the electrical contact detection part 2022 in the main body 2000 when the process cartridge is installed in the main body 3000. It should be noted that in the present disclosure, detachable installation of the process cartridge in the main body of the image-forming apparatus may refer to detachable installation of the whole or at least a part of the process cartridge in the main body of the image-forming apparatus. When the process cartridge of the present disclosure includes the moving part 3000, the process cartridge and the moving part 3000 of the present disclosure may be detachable relative to the main body of the image-forming apparatus as a whole or may be partly detachable relative to the main body of the image-forming apparatus. For example, only the process cartridge of the present disclosure may be detachably installed, but the moving part 3000 may not be detachably installed.

It should be noted that, in the present disclosure, the electrical contact of the information identification part may refer to an electrical contact portion configured to be in contact with corresponding contact detection part in the main body 2000.

In one embodiment, when the process cartridge of the present disclosure is installed at the first installation position 3001*a* and other process cartridges are installed at other installation positions 3001, L1 may be greater than L2. For example, the process cartridge of the present disclosure installed at the first installation position 3001*a* may be the K process cartridge (black), and other process cartridges may be process cartridges of other colors except the K process cartridge (black).

In another embodiment, when the process cartridge of the present disclosure is installed at the second installation position 3001*c* and other process cartridges are installed at other installation positions 3001, L1 may be less than L2. For example, in actual application, the process cartridge of the present disclosure installed at the second installation position 3001*c* may be the Y process cartridge (yellow), and other process cartridges may be process cartridges of other colors except the Y process cartridge (yellow).

In another embodiment, when the process cartridge of the present disclosure is installed at the third installation position 3001*b* and other process cartridges are installed at the first installation position 3001*a*, L1 may be less than L2. For example, the process cartridge of the present disclosure installed at the third installation position 3001*b* may be the M process cartridge (magenta) or C process cartridge (cyan), and the other process cartridges installed at the first installation position 3001*a* may be K process cartridges (black).

In another embodiment, when the process cartridge of the present disclosure is installed at the third installation position 3001*b* and other process cartridges are installed at the second installation position 3001*c*, L1 may be greater than L2. For example, the process cartridge of the present disclosure installed at the third installation position 3001*b* may be the M process cartridge (magenta) or C process cartridge (cyan), and the other process cartridges installed at the second installation position 3001*c* may be Y process cartridges (yellow).

In above-mentioned embodiment, the operation portion 3002 may be the portion on the moving part 3000 for grasp when a user manually pushes the moving part 3000 into the main body 2000 or pulls out the main body 2000 along the installation direction 200.

Through above configuration, when the moving part 3000 is pushed into or pulled out to the image-forming apparatus 100 along the installation direction 200, the force balance of the installation process of the process cartridge of the present disclosure or the process cartridge of the present disclosure combined with other process cartridges in the image-forming apparatus 100 being pushed into the main body 2000 along the installation direction 200 may be desirable, and the installation and uninstallation process may be more smooth. In addition, since L1 and L2 are different, and the value of L is configured from high to low along the installation direction 200 (that is, the direction of the process cartridge of the present disclosure and other process cartridges together being pushed into the main body 2000). Therefore, during the installation process that the process cartridge of the present disclosure is pushed into the main body 2000 along the installation direction 200, the first electrical contact 1113 of the first information identification part 1111 may only have friction with corresponding contact detection part 2022 inside the main body 2000. The wear on the electrical contacts may be relatively small which may reduce failure rate; and a stable electrical connection with the image-forming apparatus 100 may be ensured.

Figure 2:
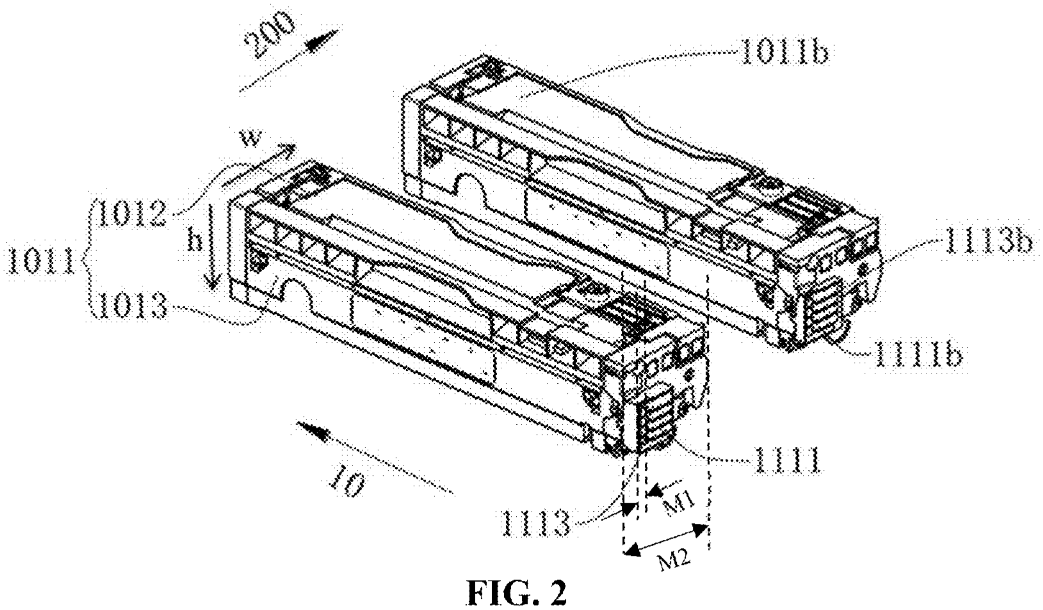
FIG. 2 illustrates a schematic of disassembly of a process cartridge and another process cartridge provided by exemplary embodiments of the present disclosure.
Figure 3:
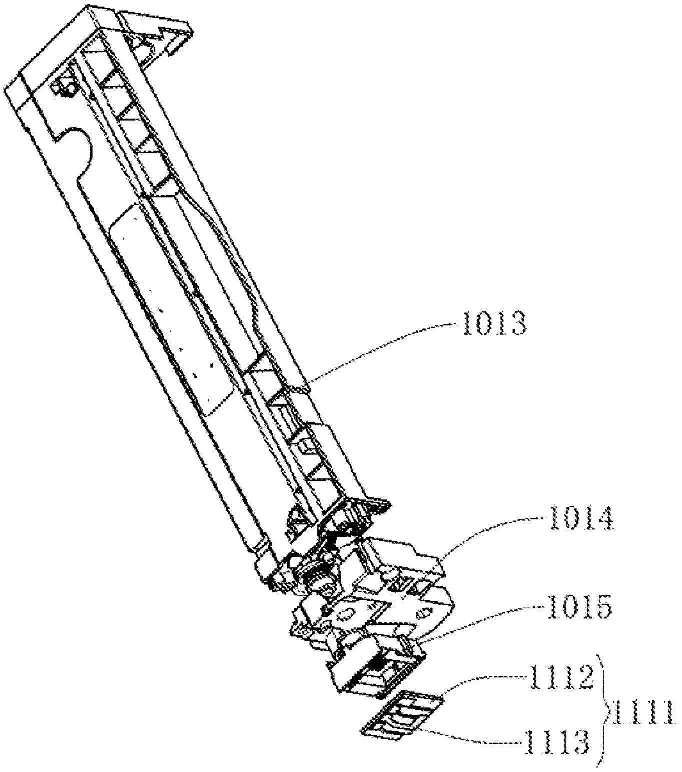
FIG. 3 illustrates an exploded view of a process cartridge provided by exemplary embodiments of the present disclosure.

As shown in FIGS. 2 and 3, the process cartridge of the present disclosure in one embodiment may be an integrated cartridge, which may include a toner bin 1012 and a waste toner bin 1013; and the toner bin 1012 and the waste toner bin 1013 may be assembled together to form the integrated cartridge. When the toner in the integrated cartridge is exhausted, entire cartridge may need to be replaced. Specifically, the first information identification part 1111 may be disposed at the end of the waste toner bin 1013. In one embodiment, the waste toner bin 1013 may further include an end cover 1014; and the information identification part may be disposed on the end cover 1014. In other embodiments, the first information identification part 1111 may also be disposed at the end of the toner bin 1012.

In other embodiments, the process cartridge of the present disclosure may be a split cartridge, which may include a developing cartridge and a drum cartridge. When the toner in the split cartridge is exhausted, the developing cartridge may be replaced. Therefore, the information identification part may be disposed on the developing cartridge.

In one embodiment, the first electrical contact 1113 may be disposed at the rear region of the end of the process cartridge of the present disclosure. The maximum value of the projected length of the rear region along the width direction w of the process cartridge of the present disclosure is M1, the maximum value of the projected length of the end of the process cartridge of the present disclosure along the width direction w of the process cartridge of the present disclosure is M2, and M1 may be less than or equal to ⅓ of M2. Compared with the front side where the toner bin 1012 of the process cartridge of the present disclosure is located, the rear region may be closer to the rear side where the waste toner bin 1013 of the process cartridge of the present disclosure is located. The end may be also disposed with a high-voltage contact 1114, and the region where the high-voltage contact 1114 is located may not be overlapped with the rear region.

The high-voltage contact 1114 may be identified by a higher voltage. The high-voltage contact 1114 may be configured for electrical connection with the main body 2000, and a voltage may be provided for the charging roller, the photosensitive drum, the developing roller, and the toner feeding roller inside the process cartridge of the present disclosure through the high-voltage contact 1114. Above configuration may avoid mutual influence between the first electrical contact 1113 and the high-voltage contact 1114. When the process cartridge of the present disclosure is installed into the main body 2000, since the first electrical contact 1113 and the high-voltage contact 1114 are at a relatively safe distance, the first electrical contact 1113 and the high-voltage contact 1114 may not affect each other. It should be understood that if the distance between the first electrical contact 1113 and the high-voltage contact 1114 is extremely close, the electromagnetic interference generated by the high-voltage of the high-voltage contact 1114 may interfere the first information identification part 1111 having the first electrical contact 1113.

In the present disclosure, the control stability and accuracy of the first information identification part 1111 may be ensured, thereby improving the image quality of the image-forming apparatus 100. In addition, the high-voltage conductive terminal in the main body 2000 in contact with the high-voltage contact 1114 may be prevent from being in contact with the first electrical contact 1113 of the first information identification part 1111, thereby preventing the first information identification part 1111 from being damaged by high voltage.

Figure 11:
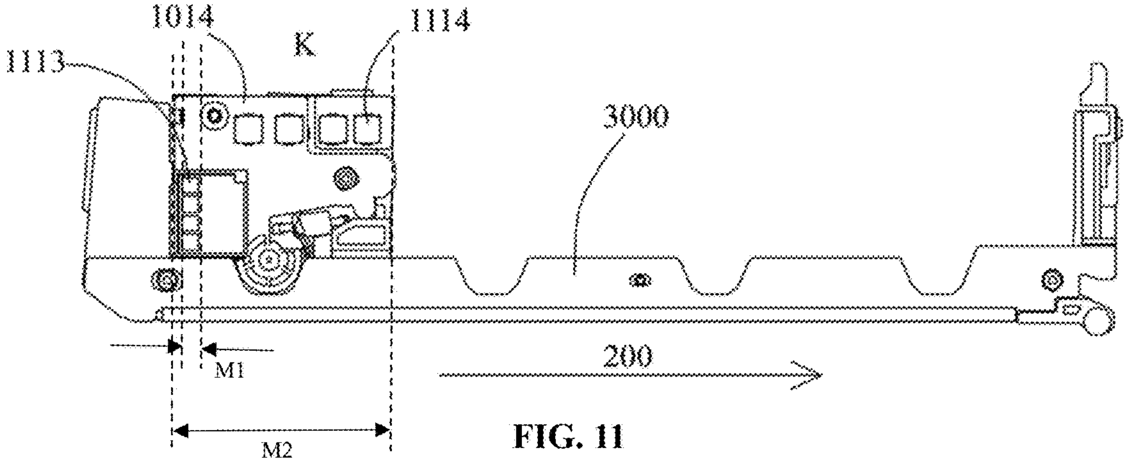
FIG. 11 illustrates a schematic of connection between a single process cartridge and a moving part provided by exemplary embodiments of the present disclosure.

Referring to FIG. 11 and FIG. 12, the arrangement direction of the plurality of first electrical contacts 1113 may intersect the arrangement direction of the plurality of high-voltage contacts 1114, which may make the process cartridge of the present disclosure more compact.

In one embodiment, the plurality of high-voltage contacts 1114 may be arranged along the direction perpendicular to the arrangement direction of the first electrical contacts 1113.

In one embodiment, the plurality of high-voltage contacts 1114 may be disposed, and the plurality of high-voltage contacts 1114 may be arranged along the direction intersecting the arrangement direction of the plurality of first electrical contacts 1113.

Referring to FIG. 11, in current solution, the arrangement directions of the first electrical contacts 1113 and the high-voltage contacts 1114 may be perpendicular to each other, which may make the design of the process cartridge of the present disclosure more compact, simplify spatial structure of the image-forming apparatus 100 and reduce production costs.

The second aspect of the present disclosure provides a process cartridge group 1001, which may include the first process cartridge 1011 and the second process cartridge 1011*b*.

The first process cartridge 1011 may include the first image-forming structural part and the first information identification part 1111. The first image-forming structural part may include the first end surface 1016. When the first process cartridge 1011 is installed in the main body 2000 of the image-forming apparatus 100, the first end surface 1016 may be adjacent to the driving apparatus in the image-forming apparatus 100. The first information identification part 1111 may include the plurality of first electrical contacts 1113 protruding along the length direction of the first process cartridge 1011. The plurality of first electrical contacts 1113 may be configured to be electrically connected to a first contact detection part 2022*a* disposed in the main body 2000. The minimum distance between any first electrical contact 1113 and the plane (the first reference plane) where the first end surface 1016 is located may be L1.

The second process cartridge 1011*b* may include the second image-forming structural part and the second information identification part 1111*b*. The second image-forming structural part may include the second end surface 1016*b*. When the second process cartridge 1011*b* is installed in the main body 2000, the second end surface 1016*b* may be adjacent to the driving apparatus in the image-forming apparatus 100. The second information identification part 1111*b* may include the plurality of second electrical contacts 1113*b* protruding along the length direction of the second process cartridge 1011*b*. The plurality of second electrical contacts 1113*b* may be configured to be electrically connected to a second contact detection part 2022*b* disposed in the main body 2000. The minimum distance between any second electrical contact 1113*b* and the plane where the second end surface 1016*b* is located (the second reference plane) or the plane where the first end surface is located (the first reference plane) may be L2. When the first process cartridge 1011 and the second process cartridge 1011*b* are installed in the main body 2000, L1 may be different from L2. In one embodiment, the plane where the first end surface 1016 is located and the plane where the second end surface 1016*b* is located may be in a same plane. Obviously, in other embodiments, the plane where the first end surface 1016 is located and the plane where the second end surface 1016*b* is located may also be located in different planes, which may not be limited herein. When the plane of the first end surface 1016 and the plane of the second end surface 1016*b* are in different planes, the minimum distance between the plane of any second electrical contact 1113*b* and the plane of the first end surface (the first reference plane) may be L2, which may also satisfy that L1 is not same as L2.

The image-forming apparatus 100 or the process cartridge group 1001 may further includes above-mentioned moving part 3000; and the moving part 3000 may include the plurality of installation positions 3001 for installing the process cartridges and include the operation portion 3002. The operation portion 3002 may be the portion on the moving part 3000 for grasp when a user manually pushes the moving part 3000 into the main body 2000 or pulls out the main body 2000 along the installation direction 20. Through above configuration, during the process that all cartridges in the process cartridge group 1001 are installed on the moving part 3000 and pushed into the main body 2000 together with the moving part 3000, when the process cartridge group 1001 is not installed in place, the information identification part on the process cartridge group 1001 may not be in contact with the contact detection part 2022. The process cartridge group may continue to be pushed in such state, the electrical contact of the information identification part may start to be in contact with corresponding contact detection part 2022, and the contact detection part 2022 may be slightly compressed by the electrical contact of the information identification part along the direction perpendicular to the surface where the contact detection part 2022 is located. The process cartridge group may continue to be pushed at this point, after the electrical contact of the information identification part and the contact detection part 2022 continue to have friction for a short distance, the process cartridge group 1001 may be installed in place.

The plurality of installation positions 3001 may include the first installation position 3001*a*, the second installation position 3001*c*, and the third installation position 3001*b* between the first installation position 3001*a* and the second installation position 3001*c*. Compared with other installation positions 3001 among the plurality of installation positions 3001, the first installation position 3001*a* may be closer to the operation portion 3002, and the second installation position 3001*c* may be farther away from the operation portion 3002. For example, when the plurality of installation positions 3001 includes four installation positions 3001, the position closer to the operation portion 3002 may be the first installation position 3001*a*; the position farther away from the operation portion 3002 may be the second installation position 3001*c*; and two installation positions 3001 between the first installation position 3001*a* and the second installation position 3001*c* may both be the third installation positions 3001*b*.

In one embodiment, when the first process cartridge 1011 is installed at the first installation position 3001*a* and the second process cartridge 1011*b* is installed at another installation position 3001, L1 may be greater than L2. For example, in actual application, the first process cartridge 1011 installed at the first installation position 3001*a* may be the K process cartridge (black), and the second process cartridge 1011*b* may be a process cartridge of other color except the K process cartridge (black).

In another embodiment, when the first process cartridge 1011 is installed at the second installation position 3001*c* and the second process cartridge 1011*b* is installed at another installation position 3001, L1 may be less than L2. For example, in actual application, the process cartridge installed at the second installation position 3001*c* may be the Y process cartridge (yellow), and the second process cartridge 1011*b* may be a process cartridge of other color except the Y process cartridge (yellow).

In another embodiment, when the first process cartridge 1011 is installed at the third installation position 3001*b* and the second process cartridge 1011*b* is installed at the first installation position 3001*a*, L1 may be less than L2, where the process cartridge installed at the third installation position 3001*b* may be the M process cartridge (magenta) or a C process cartridge (cyan), and the second process cartridge 1011*b* may be the K process cartridge (black).

In another embodiment, when the first process cartridge 1011 is installed at the third installation position 3001*b* and the second process cartridge 1011*b* is installed at the second installation position 3001*c*, L1 may be greater than L2, where the process cartridge installed at the third installation position 3001*b* may be the M process cartridge (magenta) or the C process cartridge (cyan), and the second process cartridge 1011*b* may be the Y process cartridge (yellow).

Through above configuration, when each process cartridge in the process cartridge group 1001 is installed at the installation position 3001 of the moving part 3000, since each process cartridge is at a different installation position 3001 of the moving part 3000, corresponding L value may be different. In the present disclosure, the more the installation position 3001 is close the operation portion 3002 of the moving part 3000, the larger corresponding L value is. In addition, along the installation direction 200 of the moving part 3000, the L value may be configured to be from large to small. Therefore, when the process cartridge group 1001 is inserted into the main body 2000 along with the moving part 3000, the electrical contact of the information identification part on each process cartridge may be only completely abutted against corresponding contact detection part 2022, and the force balance therebetween may be desirable, such that the installation and uninstallation process of the process cartridge group 1001 may be smoother. When the process cartridge group 1001 is pulled out, the electrical contact of the information identification part on each process cartridge and the contact detection part 2022 may be separated after having friction for a short distance, and the contact detection part 2022 may slightly bounce back to restore a relaxed state. Therefore, during the process that the moving part 3000 is pushed in or pulled out, the electrical contact of each information identification part may only have friction with corresponding contact detection part 2022, which may ensure less wear between the electrical contact of the information identification part and the contact detection part 2022.

Above structure may realize the contact and separation between the electrical contact of the information identification part and the contact detection part 2022 through the operation of pulling out or inserting the process cartridge group 1001 by the user, such that an additional driving structure to drive the contact detection part 2022 to be in contact with or separated from the electrical contact of the information identification part may be omitted to simplify the structure. Meanwhile, the friction distance between the electrical contact of the information identification part and the contact detection part 2022 may be short (the electrical contact of each information identification part may only have friction with corresponding contact detection part 2022), and the wear on the electrical contact and the contact detection part 2022 may be small, which may reduce failure rate to ensure stable connection.

In one embodiment, the process cartridge group 1001 may include four process cartridges arranged sequentially along the installation direction 200 (i.e., the depth direction of an installation chamber of the main body). For example, the process cartridge group 1001 may include 4 process cartridges (K, M, C, Y), where the 4 process cartridges (K, M, C, Y), for example, the first process cartridge 1011 (K), the second process cartridge 1011*b* (M), the third process cartridge 1011 (C) and the fourth process cartridge 1011(Y), may correspond to 4 print colors respectively. In the state where four process cartridges are sequentially installed in the main body 2000, the minimum distance between any first electrical contact 1113 of the first process cartridge 1011(K) and the plane (the first reference plane) where the first end surface 1016 is located may be L1; the minimum distance between any second electrical contact 1113*b* of the second process cartridge 1011*b* (M) and the plane (the first reference plane) where the first end surface 1016 is located may be L2; the minimum distance between any third electrical contact 1113*c* of the third process cartridge 1011 (C) and the plane (the first reference plane) where the first end surface 1016 is located may be L3 (referring to FIG. 5); and the minimum distance between any fourth electrical contact 1113*d* of the fourth process cartridge 1011(Y) and the plane (the first reference plane) where the first end surface 1016 is located may be L4 (referring to FIG. 5), where L1>L2>L3>L4. It should be noted that, in other types of image-forming apparatuses 100, the process cartridge group 1001 may also include other numbers of process cartridges.

In one embodiment, both the first electrical contact 1113 and the second electrical contact 1113*b* may be disposed on the moving part 3000. As shown in FIGS. 15-16, the process cartridge group 1001 may include four process cartridges (K, M, C, Y) and the moving part 3000, where the first to fourth electrical contacts may be sequentially disposed on the moving part 3000. When the first process cartridge 1011(K), the second process cartridge 1011*b*(M), the third process cartridge 1011(C) and the fourth process cartridge 1011(Y) are installed on the moving part 3000, the main body of the information identification part on each process cartridge may be electrically connected to the electrical contacts on the moving part 3000 in one-to-one correspondence and satisfy above-mentioned condition L1>L2>L3>L4. In other embodiments, a part of the electrical contacts of the information identification parts in the process cartridge group may be disposed on the moving part 3000, and another part of the electrical contacts may be disposed in the main body of the process cartridge.

The third aspect of the present disclosure further provides an image-forming apparatus 100, which may include the main body 2000. The main body 2000 may be disposed with the installation chamber. The main body 2000 may include the right side plate 2021, the left side plate 2031, the contact detection part 2022 (chip elastic piece), a chip pressure plate, a chip connection wire and the like.

A plurality of contact detection parts 2022 may be disposed on a sidewall 2021*a* of the installation chamber. Each contact detection part 2022 may include a plurality of electrical contact portions 20221 for being in contact with electrical contacts disposed on the process cartridge (i.e., electrical contacts of the information detection part). The plurality of contact detection parts 2022 may include the first contact detection part 2022*a* and the second contact detection part 2022*b*. The minimum distance between any electrical contact portion 20221 of the first contact detection part 2022*a* and the sidewall 2021*a* may be D1, and the minimum distance between any electrical contact portion 20221 of the second contact detection part 2022*b* and the sidewall 2021*a* may be D2, where D1 may be different from D2.

In such way, when the process cartridge group 1001 is installed in the installation chamber, the electrical contact of the information identification part on each process cartridge and the contact detection part 2022 may be connected in one-to-one correspondence. In the image-forming apparatus 100 provided in the present disclosure, the installation connection between the process cartridge group 1001 and the main body 2000 may not need an additional driving structure to drive the contact detection part 2022 to be in contact with or separated from the electrical contact of the information identification part. When the process cartridge group 1001 is pulled out of the main body 2000, the electrical contact of the information identification part may be separated from the contact detection part 2022 in the main body 2000 after a short distance of friction. When the process cartridge group 1001 is pushed into the main body 2000, the electrical contact of the information identification part and the contact detection part 2022 in the main body 2000 may be in contact with each other after a short distance of friction.

Above structure may realize the contact and separation between the electrical contact of the information identification part and the contact detection part 2022 through the operation of pulling out or inserting the process cartridge group 1001 by the user, such that active separation and contact structure may be omitted to simplify the structure. Meanwhile, the friction distance between the electrical contact of the information identification part and the contact detection part 2022 may be short (the electrical contact of each information identification part may only have friction with corresponding contact detection part 2022), and the wear on the electrical contact and the contact detection part 2022 may be small, which may reduce failure rate to ensure stable connection.

Specifically, the plurality of electrical contact portions 20221 in each contact detection part 2022 may be arranged in a row along the height direction h of the main body 2000.

It should be noted that, the electrical contact portion 20221 may be understood as a portion on the contact detection part 2022 that is in contact with the electrical contact disposed on the process cartridge.

Above-mentioned electrical contacts, such as the first electrical contact 1113, the second electrical contact 1113*b*, the third electrical contact 1113*c* or the fourth electrical contact 1113*d*, may be understood as electrical contact portions for being in contact with corresponding contact detection parts in the main body 2000.

In one embodiment, the contact detection part 2022 may include a plurality of metal elastic pieces capable of producing elastic deformation toward the sidewall 2021*a* of the installation chamber. The electrical contact portion 20221 may be disposed on the metal elastic piece, that is, the portion on the metal elastic piece that is in contact with the electrical contact disposed on the process cartridge may be the electrical contact portion 20221.

Four electrical contacts may be disposed on the information identification part on each process cartridge; and correspondingly, each contact detection part 2022 may be correspondingly disposed with four metal elastic pieces. Obviously, the number of electrical contacts on the information identification part and the number of metal elastic pieces on the contact detection part 2022 may also be other arbitrary numbers, as long as stable transmission of information therebetween may be ensured.

Figure 6:
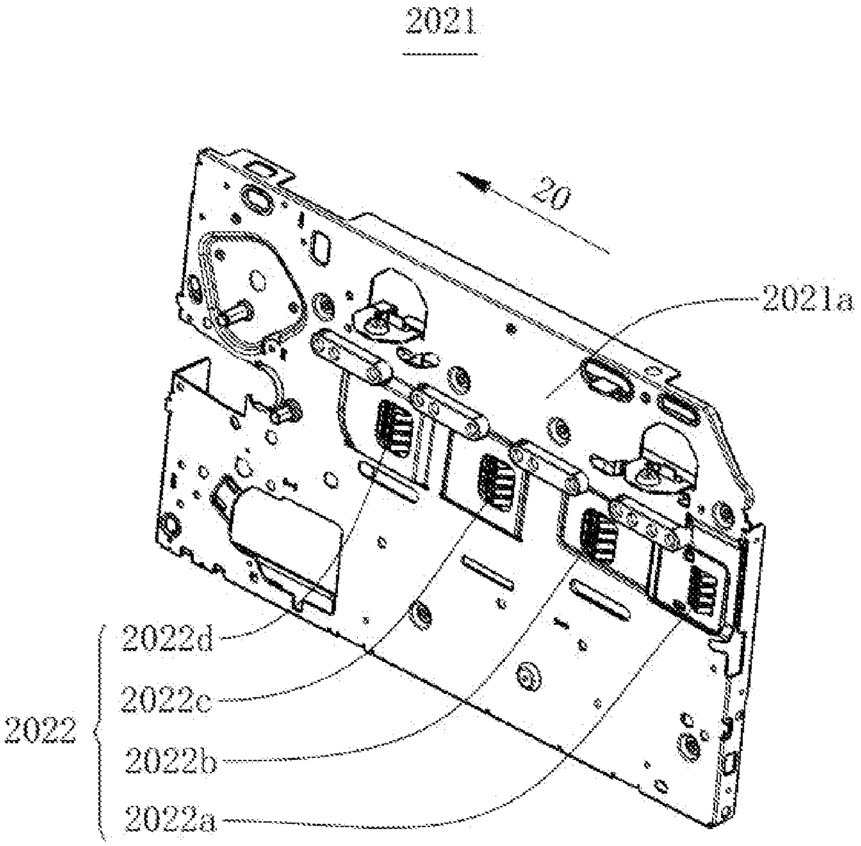
FIG. 6 illustrates a structural schematic of a side panel provided by exemplary embodiments of the present disclosure.

Specifically, the contact detection part 2022 may be a plastic piece made of a metal material with certain toughness, such as a brass elastic piece or the like. Referring to FIG. 6, the structure of the metal elastic piece may be a bent structure formed after bending. When being stressed, the metal elastic piece may produce a certain deformation, and when the external force is removed, the metal elastic piece may return to its original shape. In such way, when the process cartridge group 1001 is installed, the process cartridge group 1001 may slightly press the contact detection part 2022 to make abutment between the electrical contact and the contact detection part 2022 more closely. Such solution may further improve the connection stability between the electrical contact of the information identification part and the contact detection part 2022, thereby ensuring signal transmission stability between the electrical contact and the contact detection part 2022.

In one embodiment, the plurality of contact detection parts 2022 may further include a third contact detection part 2022*c* and a fourth contact detection part 2022*d*. The minimum distance between any electrical contact portion 20221 of the third contact detection part 2022*c* and the sidewall 2021*a* may be D3; the minimum distance between any electrical contact portion 20221 of the fourth contact detection part 2022*d* and the sidewall 2021*a* may be D4; and the first contact detection part 2022*a*, the second contact detection part 2022*b*, the third contact detection part 2022*c* and the fourth contact detection part 2022*d* may be arranged sequentially along the depth direction of the installation chamber (the direction shown by an arrow 20 in FIGS. 6-8), where D4>D3>D2>D1.

Figure 7:
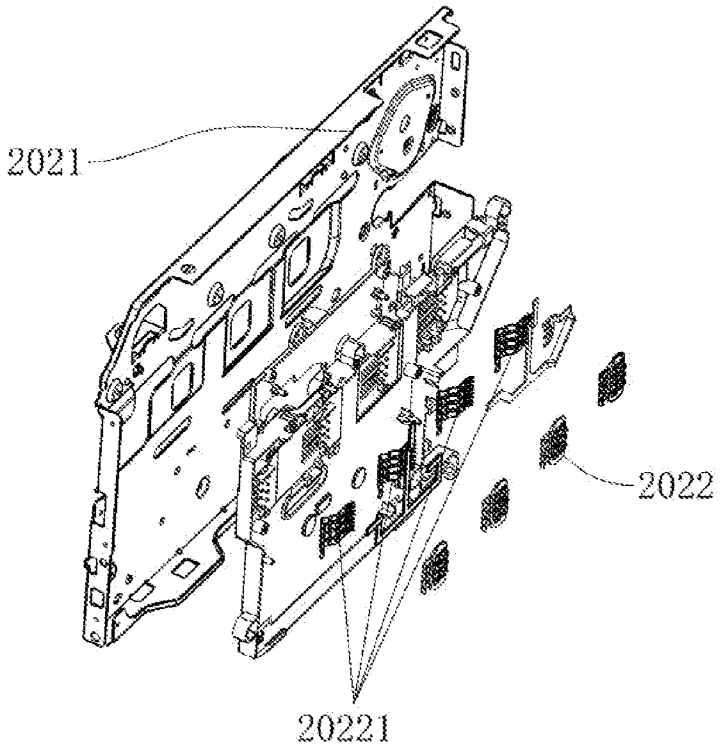
FIG. 7 illustrates an exploded view of a side panel provided by exemplary embodiments of the present disclosure.
Figure 8:
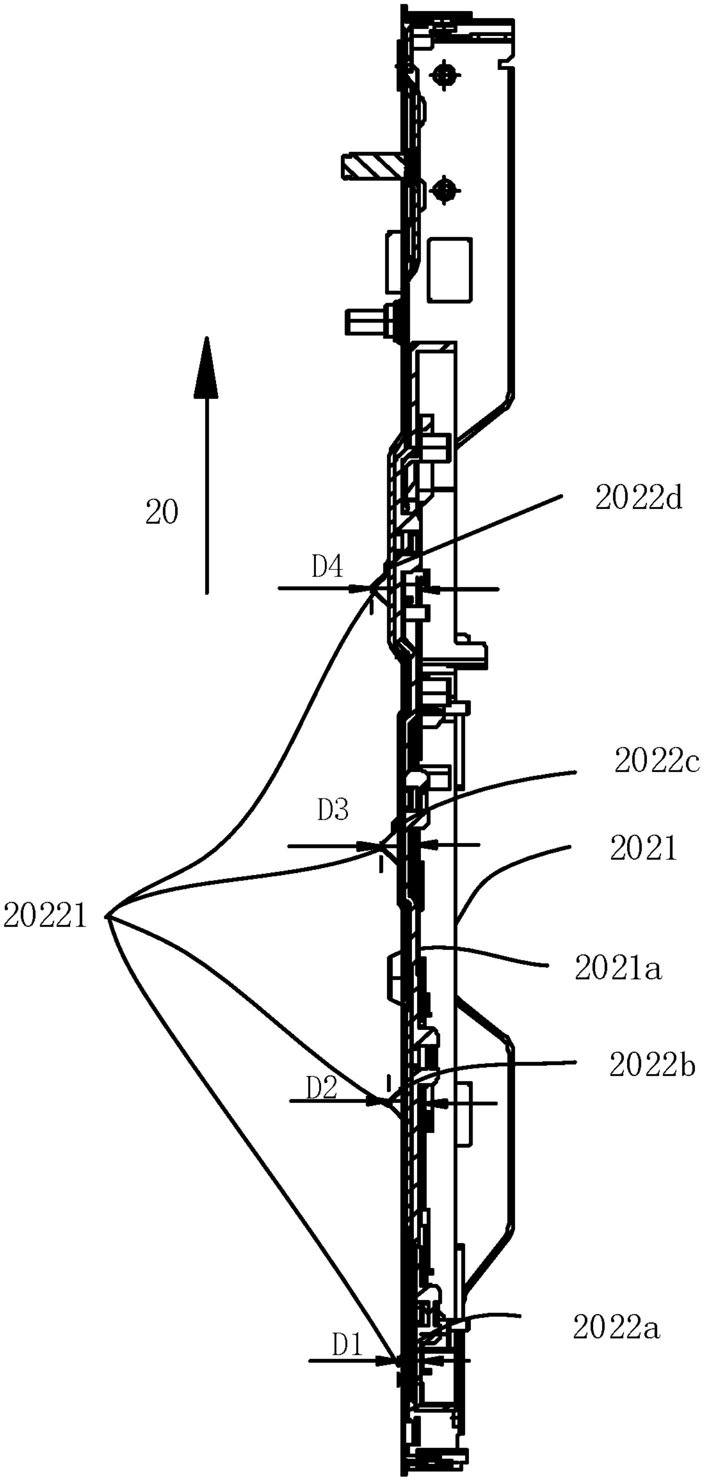
FIG. 8 illustrates a cross-sectional view of a side panel provided by exemplary embodiments of the present disclosure.
Figure 9:
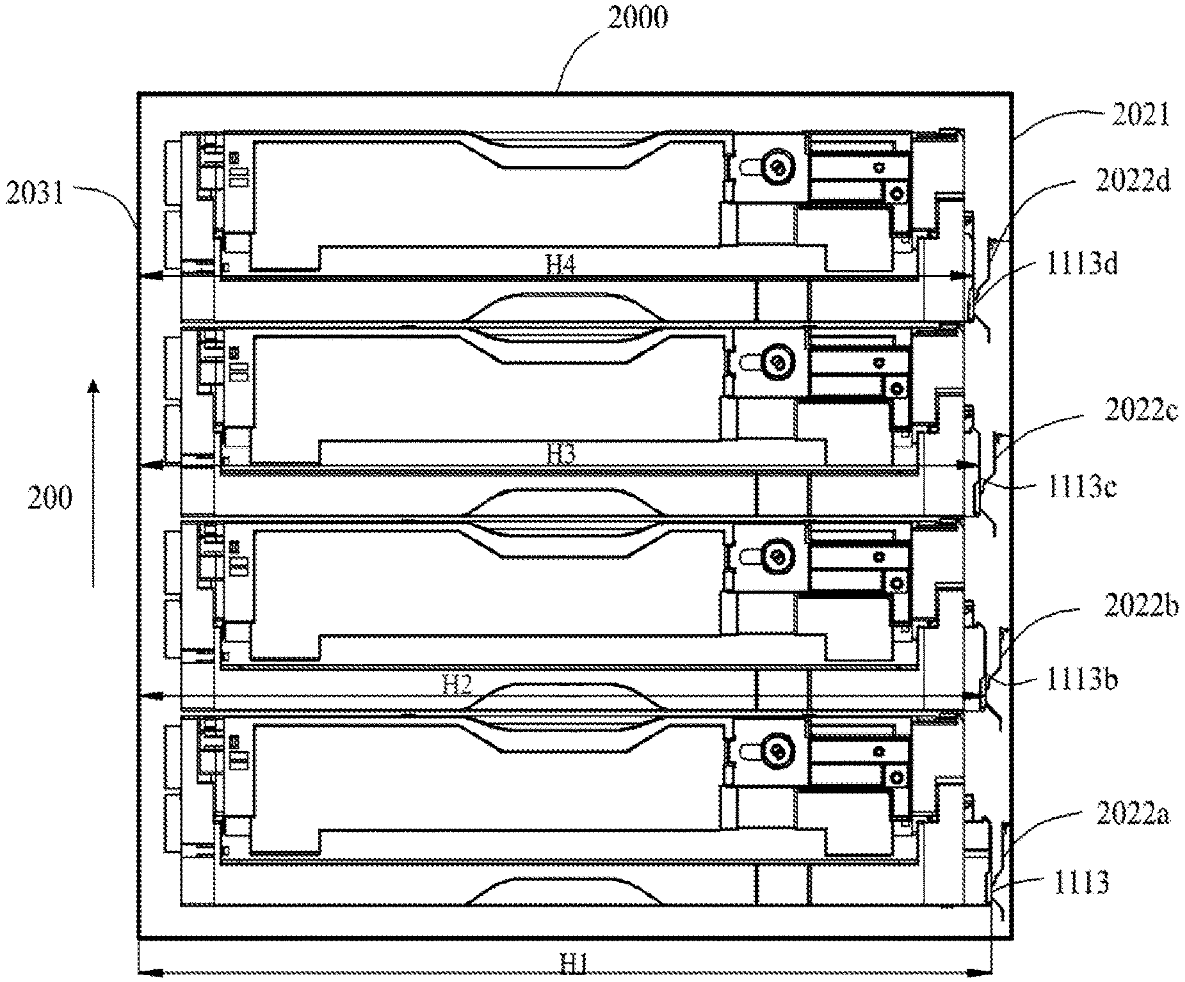
FIG. 9 illustrates a schematic of installing a process cartridge group in a main body of an image-forming apparatus provided by exemplary embodiments of the present disclosure.

Referring to FIGS. 6, 7 and 8, in one embodiment, the inner sidewall of the installation chamber may include the right side plate 2021, and four contact detection parts 2022 may be disposed on the right side plate 2021. Referring to FIGS. 1 and 8, four contact detection parts 2022 may be arranged sequentially along the depth direction of the installation chamber. That is, from the outside of the installation chamber to the inner bottom wall, the first contact detection part 2022*a*, the second contact detection part 2022*b*, the third contact detection part 2022*c* and the fourth contact detection part 2022*d* may be arranged sequentially. Moreover, from the first contact detection part 2022*a* to the fourth contact detection part 2022*d*, the contact detection part 2022 may be closer to the center of the installation chamber, that is, D4>D3>D2>D1 may be satisfied.

Such configuration may make the connection between the process cartridge group 1001 and the main body 2000 more stable, and further improve the force balance during the assembly process of the process cartridge group 1001 and the main body 2000, such that the process of installing and uninstallation the process cartridge group 1001 may be smoother.

In one embodiment, the difference between D4 and D3 may be at least same as one of the difference between D3 and D2 and the difference between D2 and D1.

In one embodiment, the image-forming apparatus 100 may include above-mentioned process cartridge group 1001 or the process cartridges.

The working principle and internal structure of the image-forming apparatus is described hereinafter in conjunction with accompanying FIGS. 10-13.

The image-forming apparatus may include an apparatus main body, and an optical scanning unit (not shown), a paper feeding unit (not shown), a fixing unit (not shown), and a process cartridge below and the like which are disposed on the apparatus main body. The working principle and process of the image-forming apparatus may be as follows. The optical scanning unit exposes the process cartridge to convert image information into an electrostatic latent image; the process cartridge converts the electrostatic latent image into a toner image; the paper feeding unit transports the paper to the position of the process cartridge, so that the toner image is transferred to the paper; the paper feeding unit sends the paper to the fixing unit, and the toner image is fixed on the paper by heating and pressing; and the paper feeding unit outputs the paper to the outside of the image-forming apparatus.

The image-forming apparatus may further include a communication unit (not shown), which is configured to be connected to terminal devices such as mobile phones and computers, so that the image-forming apparatus may obtain print jobs sent by the terminal devices. The communication unit may be a cellular network such as 2G, 3G, 4G, 5G, a wireless network such as Wi-Fi, a wireless sensor network such as Bluetooth, a near field communication unit (NFC) and other modules.

In some embodiments, referring to FIGS. 10, 11 and 12, the image-forming apparatus may further include the moving part 3000. The moving part 3000 may be detachably installed in the image-forming apparatus. After the moving part 3000 is installed in the image-forming apparatus, the moving part 3000 may move relative to the image-forming apparatus from the first position to the second position. The second position may be that the moving part is completely accommodated in the image-forming apparatus, and the first position may be that the moving part is completely exposed outside the image-forming apparatus. The plurality of process cartridges 1011 may be installed on the moving part. For example, the first process cartridge 1011 (K), the second process cartridge 1011*b* (M), the third process cartridge 1011 (C) and the fourth process cartridge 1011 (Y) may be installed and uninstalled simultaneously. The moving part may be the moving part 3000 for accommodating the plurality of process cartridges such as the first process cartridge 1011(K), the second process cartridge 1011*b*(M), the third process cartridge 1011(C) and the fourth process cartridge 1011(Y). When the moving part 3000 is located outside the apparatus main body 2000, the plurality of process cartridges may be removed from the moving part 3000. That is, the user may drive the plurality of process cartridges 1011 to move simultaneously by pushing and pulling the moving part 3000, which may be more convenient for uninstallation and installation.

Figure 13:
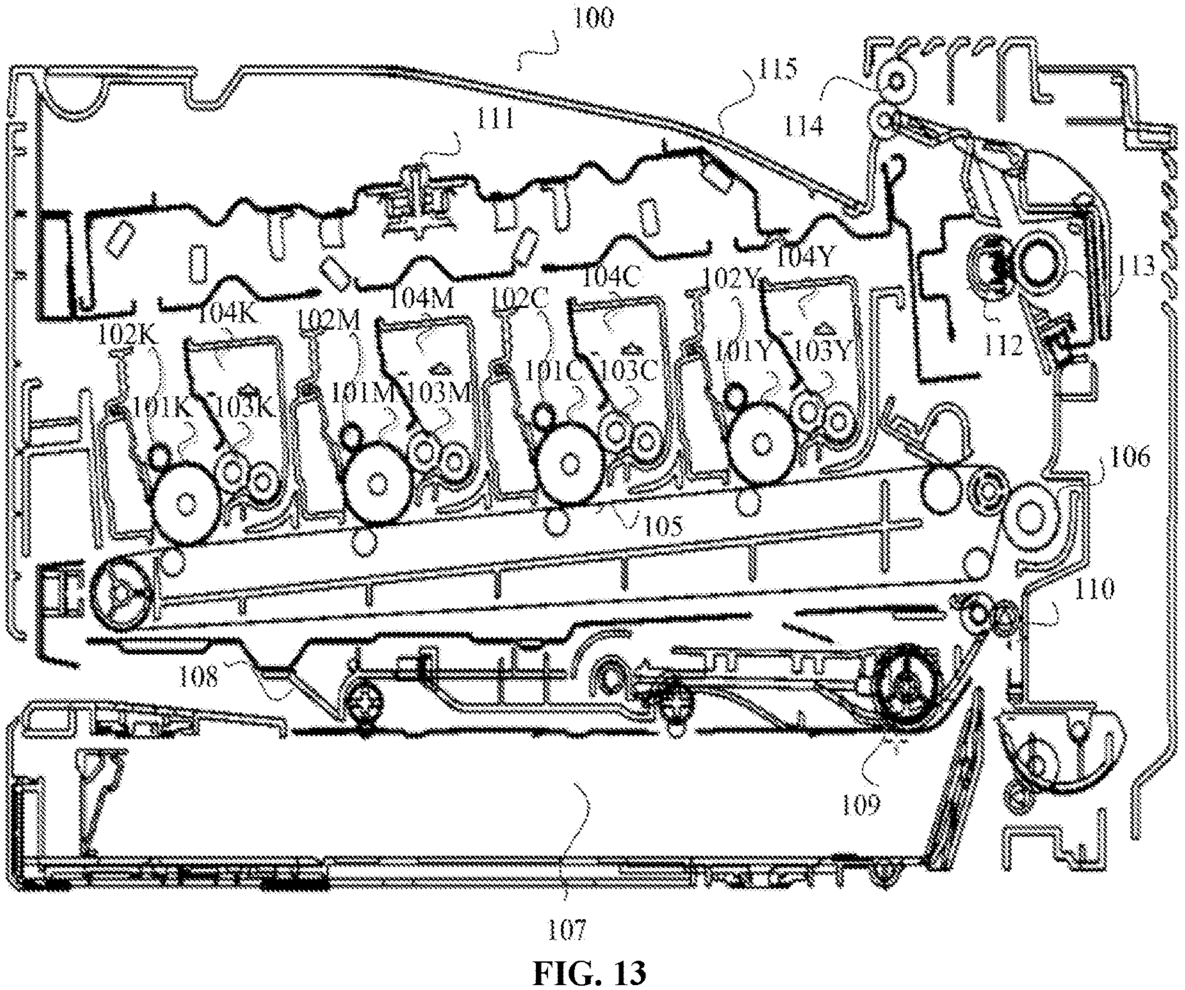
FIG. 13 illustrates an internal structural schematic of an image-forming apparatus provided by exemplary embodiments of the present disclosure.

FIG. 13 illustrates an internal structural schematic of the image-forming apparatus provided by exemplary embodiments of the present disclosure. The image-forming apparatus 100 shown in FIG. 13 may include four process cartridges (K, M, C, Y), a transfer belt 105, a secondary transfer roller 106, an input tray 107, a manual feed tray 108, and a paper feeding roller 109, a transport roller 110, a laser scanning unit (LSU for short) 111, a heating roller 112, a pressing roller 113, a discharge roller 114, and a discharge tray 115, where 4 process cartridges (K, M, C, Y) may correspond to 4 print colors respectively. The specific structure of the image-forming apparatus may include photosensitive drum 101 (K, M, C, Y), charging roller 102 (K, M, C, Y), developing roller 103 (K, M, C, Y) and toner bins 104 (K, M, C, Y) for accommodating toners of respective colors.

Figure 4:
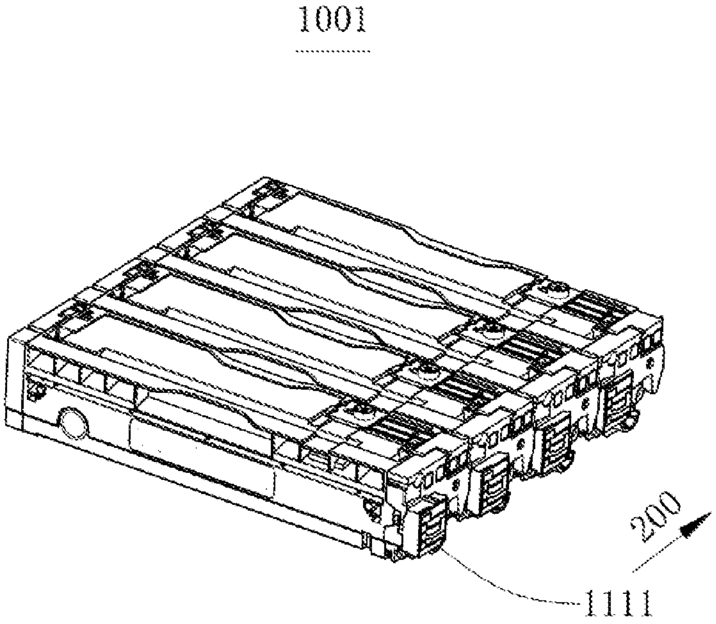
FIG. 4 illustrates a structural schematic of a process cartridge group provided by exemplary embodiments of the present disclosure.

The LSU 111 shown in FIG. 4 may be in the form of a single LSU, including four beam paths. The four charging rollers 102 (K, M, C, Y) may be configured to charge the surfaces of four photosensitive drums 101 (K, M, C, Y) respectively, and four beam paths of the LSU 111 may emit laser beams on the photosensitive drums 101 (K, M, C, Y) to form electrostatic latent images on the surfaces. The four developing rollers 103 (Y, M, C, K) may be configured to develop and form toner images of respective colors on the surfaces of the photosensitive drums 101 (K, M, C, Y). The image-forming apparatus 100 may use a secondary transfer manner, that is, the four photosensitive drums 101 (K, M, C, Y) may sequentially transfer the toner images to the transfer belt 105; and then color toner images formed on the transfer belt 105 may be secondarily transferred onto the paper via the second transfer roller 106. The paper may enter the paper tray 107 for storage, and the paper feed roller 109 may transport the stored paper to the transport path. The transport roller 110 may convey the paper on the conveying path to the secondary transfer roller 106 for transfer and image-formation. The secondary transfer roller 106 may convey imaged paper to a clamping region between the heating roller 112 and the pressing roller 113; the heating roller 112 and the pressing roller 113 may be configured to fix the toner image on the paper; the heating roller 112 may use a ceramic heating manner; the heating roller 112 and pressing roller 113 may convey the paper after fixing to the discharge roller 114; and the discharge roller 114 may discharges the paper to the discharge tray 115 to be stacked, thereby completing image print.

Above may be merely optional embodiments of the present disclosure, which may not be intended to limit the present disclosure. Any modifications, equivalent replacements, improvements and the like made within the spirit and principles of the present disclosure shall be included within the protection scope of the present disclosure.

What is claimed is:

1. An image-forming apparatus comprising a process cartridge detachably installed in the image-forming apparatus, the process cartridge comprising:

a driving portion, configured to receive a driving force from a driving apparatus in the image-forming apparatus;

an image-forming structural part, configured to be connected to the driving portion; and an information identification part, including a plurality of electrical contacts electrically connected to the image-forming apparatus, the plurality of electrical contacts being arranged along a height direction of the process cartridge, wherein:

when the process cartridge is installed in the image-forming apparatus, a minimum distance between any electrical contact of the information identification part and a side plate of the image-forming apparatus adjacent to the driving portion is H, and a value of the distance H is determined corresponding to attribute information of the process cartridge.

2. The image-forming apparatus according to claim 1, wherein that the value of the distance H is determined corresponding to the attribute information of the process cartridge comprises:

disposing an installation portion of the information identification part on an end surface of the process cartridge away from the driving portion; and determining, according to a color of the process cartridge, a maximum length of the installation portion of the information identification part that protrudes from the end surface.

3. The image-forming apparatus according to claim 1, wherein that the value of the distance H is determined corresponding to the attribute information of the process cartridge comprises:

disposing an installation portion of the information identification part on an end surface of the process cartridge away from the driving portion; and determining a minimum distance between an installation surface for installing the information identification part on the installation portion of the information identification part and the side plate of the image-forming apparatus adjacent to the driving portion according to a color of the process cartridge and/or the installation position of the process cartridge in the image forming apparatus.

4. The image-forming apparatus according to claim 1, wherein that the value of the distance H is determined corresponding to the attribute information of the process cartridge comprises:

the attribute information of the process cartridge comprises at least one type of a process cartridge color, a developer capacity, and a model; one of a plurality of attribute information types of the process cartridge or one of a plurality of installation positions of the process cartridge is selected; and each attribute information type and/or each installation position correspond to different preset distances respectively.

5. The image-forming apparatus according to claim 1, wherein:

along an installation direction of the process cartridge in the image-forming apparatus, a black process cartridge, a magenta process cartridge, a cyan process cartridge, and a yellow process cartridge are installed sequentially in the image-forming apparatus; when the black process cartridge, the magenta process cartridge, the cyan process cartridge, and the yellow process cartridge are all installed in the image-forming apparatus, a minimum distance between any electrical contact of the information identification part of the black process cartridge and the side plate of the image-forming apparatus adjacent to the driving portion is H1, a minimum distance between any electrical contact of the information identification part of the magenta process cartridge and the side plate of the image-forming apparatus adjacent to the driving portion is H2, a minimum distance between any electrical contact of the information identification part of the cyan process cartridge and the side plate of the image-forming apparatus adjacent to the driving portion is H3, and a minimum distance between any electrical contact of the information identification part of the yellow process cartridge and the side plate of the image-forming apparatus adjacent to the driving portion is H4, wherein H1>H2>H3>H4; and the distance H corresponding to a current color is determined from the H1, H2, H3 and H4 according to a color of the process cartridge.

6. The image-forming apparatus according to claim 1, wherein:

the image-forming apparatus or the process cartridge further comprises a moving part movably installed in the image-forming apparatus, and the moving part comprises an operation portion and four installation positions for installing process cartridges;

a minimum distance between an electrical contact of the information identification part of a process cartridge installed on a first installation position of the moving part closest to the operation portion and the side plate of the image-forming apparatus adjacent to the driving portion is H1;

a minimum distance between an electrical contact of the information identification part of a process cartridge installed on a second installation position of the moving part farthest from the operation portion and the side plate of the image-forming apparatus adjacent to the driving portion is H4;

a minimum distance between an electrical contact of the information identification part of a process cartridge, installed between the first installation position and the second installation position on the moving part and on an installation position adjacent to the first installation position, and the side plate of the image-forming apparatus adjacent to the driving portion is H2;

a minimum distance between an electrical contact of the information identification part of a process cartridge, installed between the first installation position and the second installation position on the moving part and on an installation position adjacent to the second installation position, and the side plate of the image-forming apparatus adjacent to the driving portion is H3, where H1>H2>H3>H4; and a corresponding distance H is determined from the H1, H2, H3 and H4 according to an installation position of the process cartridge on the moving part.

7. The image-forming apparatus according to claim 1, wherein:

at least one electrical contact of the plurality of electrical contacts is fixedly or movably disposed relative to the process cartridge.

8. The image-forming apparatus according to claim 1, wherein:

the process cartridge comprises a toner bin and a waste toner bin capable of being assembled together; and the information identification part is at least partly disposed on an end surface of the toner bin or an end surface of the waste toner bin.

9. The image-forming apparatus according to claim 1, wherein:

the process cartridge comprises a developing cartridge or a drum cartridge; and the information identification part is at least partially disposed on an end surface of the developing cartridge or an end surface of the drum cartridge.

10. The image-forming apparatus according to claim 1, wherein:

the information identification part further comprises a substrate; the plurality of electrical contacts is disposed on the substrate; and the plurality of electrical contacts is arranged in a row along the height direction of the process cartridge; or the information identification part further comprises a substrate and a connecting part; the connecting part is electrically connected to the substrate; and the plurality of the electrical contacts is disposed on the connecting part and electrically connected to the substrate through the connecting part.

11. The image-forming apparatus according to claim 1, wherein:

the image-forming apparatus or the process cartridge further comprises a moving part movably installed in the main body; and at least one electrical contact of the plurality of electrical contacts is disposed on the moving part.

12. The image-forming apparatus according to claim 1, wherein:

at least one electrical contact of the plurality of electrical contacts is disposed at a rear region of an end of the process cartridge, wherein a maximum value of a length of the rear region along a width direction of the process cartridge is M1, a maximum value of a length of the end of the process cartridge along the width direction of the process cartridge is M2, and M1 is less than or equal to ⅓ of M2; compared with a front side where a toner bin of the process cartridge is located, the rear region is closer to a rear side where a waste toner bin of the process cartridge is located; and the end is also disposed with a high-voltage contact, and a region of the high-voltage contact does not coincide with the rear region.

13. The image-forming apparatus according to claim 12, wherein:

a plurality of high-voltage contacts is disposed; and the plurality of high-voltage contacts is arranged along a direction intersecting with an arrangement direction of the plurality of electrical contacts; or the plurality of high-voltage contacts is arranged along a direction perpendicular to an arrangement direction of the plurality of electrical contacts.

14. A process cartridge group comprising:

a plurality of process cartridges, wherein at least one process cartridge of the plurality of process cartridges is detachably installed in the image-forming apparatus according to claim 8, and the plurality of process cartridges comprises:

a first process cartridge, comprising a first image-forming structural part and a first information identification part, wherein the first image-forming structural part comprises a first end surface; when the first process cartridge is installed in a main body of the image-forming apparatus, the first end surface is adjacent to a driving apparatus in the image-forming apparatus; the first information identification part comprises a plurality of first electrical contacts; the plurality of first electrical contacts is configured to be in contact with and electrically connected to first contact detection parts disposed in the main body of the image-forming apparatus; and taking any point on the first end surface as a first reference point, a plane passing through the first reference point and perpendicular to a length direction of the first process cartridge is a first reference plane; and a second process cartridge, including a second image-forming structural part and a second information identification part, wherein the second image-forming structural part comprises a second end surface; when the second process cartridge is installed in the main body of the image-forming apparatus, the second end surface is adjacent to the driving apparatus in the image-forming apparatus; the second information identification part comprises a plurality of second electrical contacts; the plurality of second electrical contacts is configured to be in contact with and electrically connected to second contact detection parts disposed in the main body of the image-forming apparatus; and taking any point on the second end surface as a second reference point, a plane passing through the second reference point and perpendicular to the length direction of the second process cartridge is a second reference plane, wherein:

when the first process cartridge and the second process cartridge are installed in the main body of the image-forming apparatus, a minimum distance between any first electrical contact and the first reference plane is L1; a minimum distance between any second electrical contact and the second reference plane or the first reference plane is L2, and L1 is different from L2.

15. The process cartridge group according to claim 14, wherein:

at least one first electrical contact of the plurality of first electrical contacts is fixedly or movably disposed relative to the first process cartridge; and/or at least one second electrical contact of the plurality of second electrical contacts is fixedly or movably disposed relative to the second process cartridge.

16. The process cartridge group according to claim 14, wherein:

the image-forming apparatus or the process cartridge group further comprises a moving part movably installed in the main body of the image-forming apparatus; and at least one first electrical contact of the plurality of first electrical contacts and/or at least one second electrical contact of the plurality of second electrical contacts are disposed on the moving part.

17. The process cartridge group according to claim 14, wherein:

the image-forming apparatus or the process cartridge group further comprises a moving part movably installed in the main body of the image-forming apparatus; the moving part comprises an operation portion and a plurality of installation positions; each of the installation positions is configured to install a process cartridge; the plurality of installation positions comprises a first installation position, a second installation position and a third installation position; the first installation position is closer to the operation portion than the second installation position and the third installation position; the second installation position is further away from the operation portion than the first installation position and the third installation position; and the third installation position is between the first installation position and the second installation position; and when the first process cartridge and the second process cartridge are installed at different installation positions, any one of the following is satisfied:

when the first process cartridge is installed at the first installation position and the second process cartridge is installed at another installation position, L1 is greater than L2;

when the first process cartridge is installed at the second installation position and the second process cartridge is installed at another installation position, L1 is less than L2;

when the first process cartridge is installed at the third installation position and the second process cartridge is installed at the first installation position, L1 is less than L2; and when the first process cartridge is installed at the third installation position and the second process cartridge is installed at the second installation position, wherein L1 is greater than L2.

18. The process cartridge group according to claim 14, further including:

a third process cartridge and a fourth process cartridge, wherein:

the third process cartridge comprises a third information identification part; the third information identification part comprises a plurality of third electrical contacts; and the plurality of third electrical contacts is configured to be in contact with and electrically connected to third contact detection parts disposed in the main body of the image-forming apparatus;

the fourth process cartridge comprises a fourth information identification part; the fourth information identification part comprises a plurality of fourth electrical contacts; and the plurality of fourth electrical contacts is configured to be in contact with and electrically connected to fourth contact detection parts disposed in the main body of the image-forming apparatus; and when the first process cartridge, the second process cartridge, the third process cartridge and the fourth process cartridge are arranged and installed in the main body of the image-forming apparatus sequentially along a depth direction of an installation chamber of the main body of the image-forming apparatus, a minimum distance between any third electrical contact and the first reference plane is L3; and a minimum distance between any fourth electrical contact and the first reference plane is L4, wherein L1>L2>L3>L4.

* * * * *